US012626164B2

(12) United States Patent
Ezrielev et al.

(10) Patent No.: US 12,626,164 B2
(45) Date of Patent: May 12, 2026

(54) SYSTEM AND METHOD FOR REDUCTION OF DATA TRANSMISSION BY DATA RECONSTRUCTION

(71) Applicant: Dell Products L.P., Round Rock, TX (US)

(72) Inventors: Ofir Ezrielev, Be'er Sheva (IL); Jehuda Shemer, Kfar Saba (IL)

(73) Assignee: Dell Products L.P., Round Rock, TX (US)

( * ) Notice: Subject to any disclaimer, the term of this patent is extended or adjusted under 35 U.S.C. 154(b) by 979 days.

(21) Appl. No.: 17/726,040

(22) Filed: Apr. 21, 2022

(65) Prior Publication Data

US 2023/0342641 A1 Oct. 26, 2023

(51) Int. Cl.
| | |
|---|---|
| *G06F 16/2455* | (2019.01) |
| *G06F 18/21* | (2023.01) |
| *G06N 5/043* | (2023.01) |

(52) U.S. Cl.
CPC ....... *G06N 5/043* (2013.01); *G06F 16/24556* (2019.01); *G06F 18/217* (2023.01)

(58) Field of Classification Search
CPC .. G06N 5/043; G06N 20/00; G06F 16/24556; G06F 18/217; G06F 17/40; G06V 10/774
See application file for complete search history.

(56) References Cited

U.S. PATENT DOCUMENTS

| | | |
|---|---|---|
| 11,526,745 B2 | 12/2022 | Sheller |
| 2016/0026520 A1 | 1/2016 | Bouta et al. |
| 2019/0044786 A1 | 2/2019 | Wouhaybi et al. |
| 2020/0219015 A1 | 7/2020 | Lee |
| 2021/0376853 A1 | 12/2021 | De et al. |
| 2022/0318687 A1 | 10/2022 | Rajagopalan |
| 2023/0259740 A1 | 8/2023 | Kulkarni |

OTHER PUBLICATIONS

Matsubara ("BottleFit: Learning Compressed Representations in Deep Neural Networks for Effective and Efficient Split Computing" 20220414) arXiv:2201.02693v2 [cs.LG] Apr. 14, 2022 (Year: 2022).*
Zhang ("Compressive Sensing and Autoencoder Based Compressed Data Aggregation for Green IoT Networks" 20191209) 2019 IEEE Global Communications Conference (GLOBECOM) (Year: 2019).*
Ghosh ("Deep Learning: Edge-Cloud Data Analytics for IoT" 20190505) 2019 IEEE Canadian Conference of Electrical and Computer Engineering (CCECE) (Year: 2019).*

(Continued)

*Primary Examiner* — Usmaan Saeed
*Assistant Examiner* — Su-Ting Chuang
(74) *Attorney, Agent, or Firm* — WOMBLE BOND DICKINSON (US) LLP

(57) ABSTRACT

Methods and systems for managing data collection are disclosed. To manage data collection, a system may include a data aggregator and a data collector. The data aggregator and data collector may utilize identical copies of a twin inference model to predict the future operation of the data collector. To minimize data transmission, the data collector may transmit a difference to the data aggregator. The data aggregator may reconstruct data from the data collectors using the difference from the data collector, and an inference generated by the copy of the twin inference model hosted by the data aggregator.

20 Claims, 16 Drawing Sheets

(56) References Cited

OTHER PUBLICATIONS

Niu ("An Adaptive Device-Edge Co-Inference Framework Based on Soft Actor-Critic" 20220109) arXiv:2201.02968v1 [cs.LG] Jan. 9, 2022 (Year: 2022).*

Fu ("Secure Data Storage and Searching for Industrial IoT by Integrating Fog Computing and Cloud Computing" 20180115) IEEE Transactions on Industrial Informatics, vol. 14, No. 10, Oct. 2018 Date of publication Jan. 15, 2018; (Year: 2018).*

Li ("Deep Learning for Smart Industry: Efficient Manufacture Inspection System With Fog Computing" 20180601) IEEE Transactions on Industrial Informatics, vol. 14, No. 10, Oct. 2018 Date of publication Jun. 1, 2018 (Year: 2018).*

Tschannen ("Recent Advances in Autoencoder-Based Representation Learning" 20181212) arXiv:1812.05069v1 [cs.LG] Dec. 12, 2018 (Year: 2018).*

Madani ("Robustness of Deep Autoencoder in Intrusion Detection under Adversarial Contamination" 20180410) HoTSoS '18, Apr. 10-11, 2018, Raleigh, NC, USA (Year: 2018).*

Belouadah ("IL2M: Class Incremental Learning With Dual Memory" 20191027) 2019 IEEE/CVF International Conference on Computer Vision (ICCV) (Year: 2019).*

Zhao ("Memory-Efficient Class-Incremental Learning for Image Classification" 20210503) IEEE Transactions On Neural Networks and Learning Systems, vol. 33, No. 10, Oct. 2022 Date of publication May 3, 2021 (Year: 2021).*

Deja ("BinPlay: A Binary Latent Autoencoder for Generative Replay Continual Learning" 20210718) 2021 International Joint Conference on Neural Networks (IJCNN) | 978-1-6654-3900-8/21/$31.00 © 2021 IEEE | DOI: 10.1109/IJCNN52387.2021.9534171 (Year: 2021).*

Lewandowski, M.; Płaczek, B.; Bernas, M.; Classifier-Based Data Transmission Reduction in Wearable Sensor Network for Human Activity Monitoring. Sensors 2021, 21, 85. https://doi.org/10.3390/s21010085.

Le Borgne, Yann-Aël & Santini, Silvia & Bontempi, Gianluca. (2007). Adaptive model selection for time series prediction in wireless sensor networks. Signal Processing. 87. 3010-3020. 10.1016/j.sigpro.2007.05.015.

Ankur Jain, Edward Y. Chang, Yuan-Fang Wang; Adaptive stream resource management using Kalman Filters. SIGMOD '04: Proceedings of the 2004 ACM SIGMOD international conference on Management of data Jun. 2004 pp. 11-22 https://doi.org/10.1145/1007568.1007573.

X. Feng, X. Zhenzhen, Y. Lin, S. Weifeng and L. Mingchu, "Prediction-based data transmission for energy conservation in wireless body sensors," 2010 The 5th Annual ICST Wireless Internet Conference (WICON), 2010, pp. 1-9.

Tulone, Daniela & Madden, Samuel. (2006). An energy-efficient querying framework in sensor networks for detecting node similarities. 191-300. 10.1145/1164717.1164768.

Lu, Qing & Jiang, Weiwen & Xu, Xiaowei & Shi, Yiyu & Hu, Jingtong. (2019). On Neural Architecture Search for Resource-Constrained Hardware Platforms.

"Detecting data drift on data sets," Web page <https://docs.microsoft.com/en-us/azure/machine-learning/how-to-monitor-datasets?tabs=python>, Nov. 10, 2021, retrieved from Internet Archive Wayback Machine <https://web.archive.org/web/20210420083010/https://docs.microsoft.com/en-us/azure/machine-learning/how-to-monitor-datasets?tabs-python> on Apr. 27, 2022).

Pearl, Judea. "Causal inference in statistics: An overview." Statistics surveys 3 (2009): 96-146. https://projecteuclid.org/journals/statistics-surveys/volume-3/issue-none/Causal-inference-in-statistics-An-overview/10.1214/09-SS057.short.

Xie, Yaochen, et al. "Self-supervised learning of graph neural networks: A unified review." IEEE Transactions on Pattern Analysis and Machine Intelligence (2022). https://ieeexplore.ieee.org/abstract/document/9764632/.

Kumar, Manoj, et al. "Genetic algorithm: Review and application." Available at SSRN 3529843 (2010). https://papers.ssm.com/sol3/papers.cfm?abstract_id=3529843.

Lewandowski et al., "Classifier-Based Data Transmission Reduction in Wearable Sensor Network for Human Activity Monitoring", Sensors 2021, 21, 85. <https://dx.doi.org/10.3390/s21010085>, Dec. 25, 2020, 22 pages (Year: 2020).

Cui et al., "Classification of data aggregation functions in wireless sensor networks", Computer Networks, vol. 178, 107342, <https://doi.org/10.1016/j.comnet.2020.107342>, 13 pages (Year: 2020).

Liazid et al., "An improved adaptive dual prediction scheme for reducing data transmission in wireless sensor networks", Wireless Networks, 25:3545-3555, <https://doi.org/10.1007 /s11276-019-01950-7>, Feb. 2, 2019, 11 pages (Year: 2019).

Chen et al., "Online Model-Driven Data Acquisition for Wireless Sensor Networks", 2015 IEEE Wireless Communications and Networking Conference (Wcnc). IEEE, 2015, 6 pages (Year: 2015).

Zhang et al., "Lightweight Self-Adapting Linear Prediction Algorithms for Wireless Sensor Networks", IEEE Sensors Journal, vol. 15, No. 5, May 2015, pp. 3050-3058 (Year: 2014).

Jain et al., "A Novel Data Prediction Technique Based on Correlation for Data Reduction in Sensor Networks", Proceedings of International Conference on Artificial Intelligence and Applications: ICAIA 2020. Springer Singapore, 2021, 12 pages (Year: 2020).

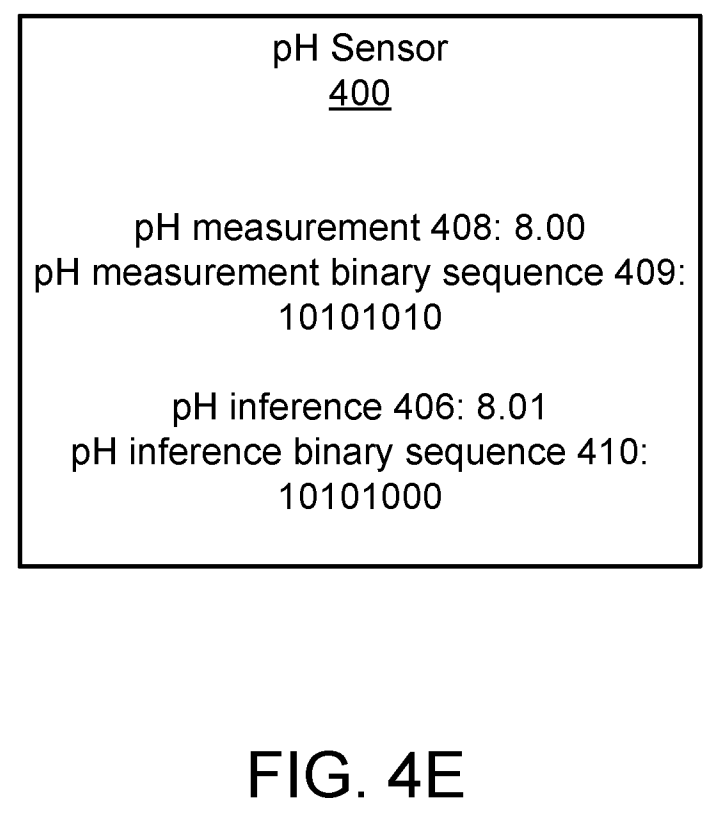

* cited by examiner pH Sensor
400 pH measurement 408: 8.00
pH measurement binary sequence 409:
10101010 pH inference 406: 8.01
pH inference binary sequence 410:
10101000

FIG. 4E

SYSTEM AND METHOD FOR REDUCTION OF DATA TRANSMISSION BY DATA RECONSTRUCTION

FIELD

Embodiments disclosed herein relate generally to data collection. More particularly, embodiments disclosed herein relate to systems and methods to limit the transmission of data during data collection.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 4A-4I show block diagrams illustrating a system in accordance with an embodiment over time.

DETAILED DESCRIPTION

Figure 1:
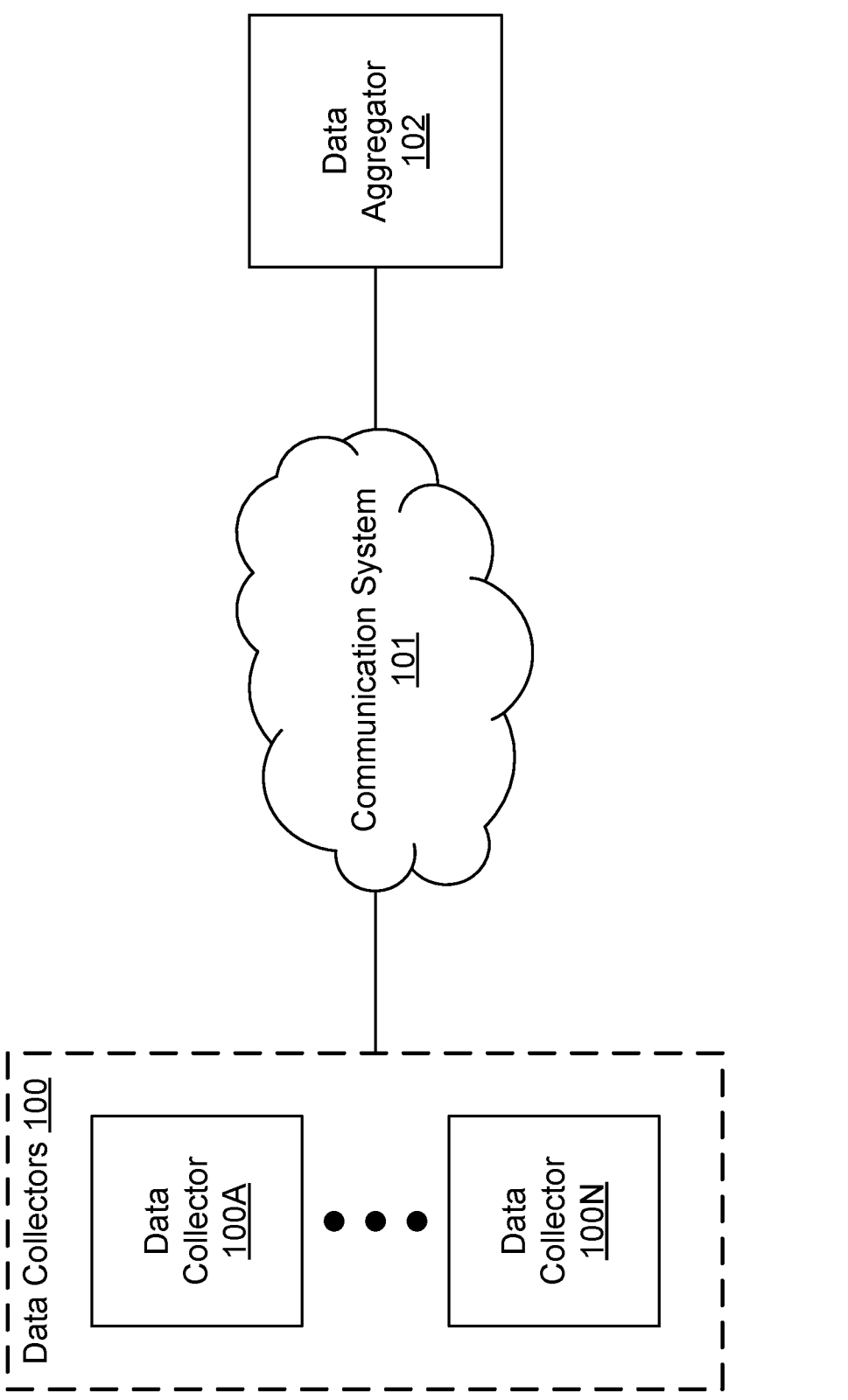
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing data collection in a distributed environment. To manage data collection, the system may include a data aggregator and a data collector. The data aggregator may utilize a copy of a twin inference model to predict data based on future measurements performed by data collectors throughout a distributed environment without having access to the measurements. The data collector may host a second identical copy of a twin inference model. Therefore, the data aggregator and data collector may have access to identical sets of inferences.

To obtain the twin inference models, training data may be used to train the twin inference models to predict future measurements obtained by the data collectors. The data collectors may include any type and quantity of data collectors including, for example, temperature data collectors, pH data collectors, humidity data collectors, etc. Therefore, the disclosed system may be broadly applicable to a wide variety of data collectors that may generate various types and quantities of measurements.

To attempt to reduce data transmission, the data aggregator may obtain a difference from a data collector, a difference being a reduced-size representation of a measurement performed by a data collector. The data collector may obtain this difference using (i) a measurement performed by the data collector and (ii) an inference obtained via the copy of the twin inference model hosted by the data collector.

The data aggregator may reconstruct data using (i) the difference obtained from the data collector and (ii) the inference obtained via a copy of the twin inference model hosted by the data aggregator. The inference obtained by the data aggregator may be identical to the inference utilized by the data collector to obtain the difference. Therefore, the data aggregator may access the exact measurement performed by the data collector without measurements being transmitted over a communication system. Consequently, data transmission may be reduced, communication system bandwidth may be conserved, and energy consumption of the devices may be reduced throughout the system.

In an embodiment, a method for managing data collection in a distributed environment where data is collected in a data aggregator of the distributed environment and from at least a data collector operably connected to the data aggregator via a communication system is provided.

The method may include obtaining, from the data collector, a difference, the difference being based on: data obtained via a measurement performed by the data collector, and a first inference generated by the data collector, the inference being intended to match the data; reconstructing, by the data aggregator, the data using the difference and a second inference generated by the data aggregator, the second inference being intended to match the data; performing an action set based at least in part on the reconstructed data, the action set comprising one or more actions to be performed based on the data obtained by the measurement performed by the data collector, and while the data aggregator does not have access to the data obtained by the data collector.

The method may also include making a determination that the difference falls below a threshold; and based on that determination: treating a twin inference model as being accurate, the twin inference model being implemented by the data aggregator and the data collector, and the twin inference model being used to obtain the first inference and the second inference.

The method may also include making a determination that the difference falls outside of a threshold; and based on that determination: treating a twin inference model as being inaccurate, the twin inference model being implemented by the data aggregator and the data collector, and the twin inference model being used to obtain the first inference and the second inference.

The method may also include when the twin inference model is determined as being inaccurate: updating the twin inference model using training data, the training data comprising a portion of data obtained via a series of measurements performed by the data collector.

The method may also include prior to obtaining the difference: obtaining, by the data aggregator, a twin inference model using training data obtained, at least in part, from the data collector; and distributing, by the data aggregator, a copy of the twin inference model to the data collector.

A value of the difference may decrease as accuracy of the twin inference model increases, and the value of the difference may increase as the accuracy of the twin inference model decreases.

A quantity of bits necessary to communicate the difference via the communication system may decrease as the accuracy of the twin inference model increases.

The action set may not be based on any data from measurements performed by the data collector that is transmitted via the communication system to the data aggregator.

The measurement may be performed using a sensor that measures a characteristic of an ambient environment proximate to the data collector, the ambient environment proximate to the data collector being different from an ambient environment proximate to the data aggregator.

The one or more actions may be triggered to be performed based on the ambient environment proximate to the data collector and may be independent from the ambient environment proximate to the data aggregator.

A non-transitory media may include instructions that when executed by a processor cause the computer-implemented method to be performed.

A data processing system may include the non-transitory media and a processor, and may perform the computer-implemented method when the computer instructions are executed by the process.

Turning to FIG. 1, a block diagram illustrating a system in accordance with an embodiment is shown. The system shown in FIG. 1 may provide computer-implemented services that may utilize data aggregated from various sources throughout a distributed environment.

The system may include data aggregator 102. Data aggregator 102 may provide all, or a portion, of the computer-implemented services. For example, data aggregator 102 may provide computer-implemented services to users of data aggregator 102 and/or other computing devices operably connected to data aggregator 102. The computer-implemented services may include any type and quantity of services which may utilize, at least in part, data aggregated from a variety of sources (e.g., data collectors 100) within a distributed environment.

For example, data aggregator 102 may be used as part of a control system in which data that may be obtained by data collectors 100 is used to make control decisions. Data such as temperatures, pressures, etc. may be collected by data collectors 100 and aggregated by data aggregator 102. Data aggregator 102 may make control decisions for systems using the aggregated data. In an industrial environment, for example, data aggregator 102 may decide when to open and/or close valves using the aggregated data. Data aggregator 102 may be utilized in other types of environments without departing from embodiments disclosed herein.

To facilitate data collection, the system may include one or more data collectors 100. Data collectors 100 may include any number of data collectors (e.g., 100A-100N). For example, data collectors 100 may include one data collector (e.g., 100A) or multiple data collectors (e.g., 100A-100N) that may independently and/or cooperatively provide data collection services.

For example, all, or a portion, of data collectors 100 may provide data collection services to users and/or other computing devices operably connected to data collectors 100. The data collection services may include any type and quantity of services including, for example, temperature data collection, pH data collection, humidity data collection, etc. Different systems may provide similar and/or different data collection services.

To aggregate data from data collectors 100, some portion and/or representations of data collected by data collectors 100 may be transmitted across communication system 101 to data aggregator 102 (and/or other devices). The transmission of large quantities of data over communication system 101 may have undesirable effects on the communication system 101, data aggregator 102, and/or data collectors 100. For example, transmitting data across communication system 101 may consume network bandwidth and increase the energy consumption of data collectors 100 used for data transmission.

In general, embodiments disclosed herein may provide methods, systems, and/or devices for managing data collection in a distributed environment. To manage data collection in a distributed environment, a system in accordance with an embodiment may limit the transmission of data between components of the system while ensuring that all components that need access to the data to provide their respective functions are likely to have access to accurate data (e.g., such as the data based on measurements performed by data collectors 100). By limiting the transmission of data, communication bandwidth of the system of FIG. 1 may be preserved, energy consumption for data transmission may be reduced, etc.

To limit the transmission of data, data collectors 100 may transmit only a difference rather than the data itself, the difference may be a reduced-size representation of data based on (i) a measurement performed by the data collector (e.g., data collector 100A) and (ii) an inference generated by the data collector (e.g., data collector 100A).

To provide its functionality, data aggregator 102 may (i) obtain a difference from a data collector, (ii) obtain an inference utilizing one copy of a twin inference model trained to predict data based on measurements performed by a data collector (e.g., data collector 100A), (iii) reconstruct the data using the difference and the inference generated one copy of the twin inference model, (iii) perform an action set based on the reconstructed data, (iv) determine whether the difference falls below a threshold, (v) when the difference falls below the threshold, treat the twin inference model as being accurate, and/or (vi) when the difference falls outside the threshold, perform corrective action to increase the accuracy of future inferences obtained by the data aggregator. By doing so, data aggregator 102 may perform data collection without obtaining (all of, or a portion thereof) data based on a series of measurements performed by data collectors 100 and, therefore, reduce data transmission.

Figure 3A:
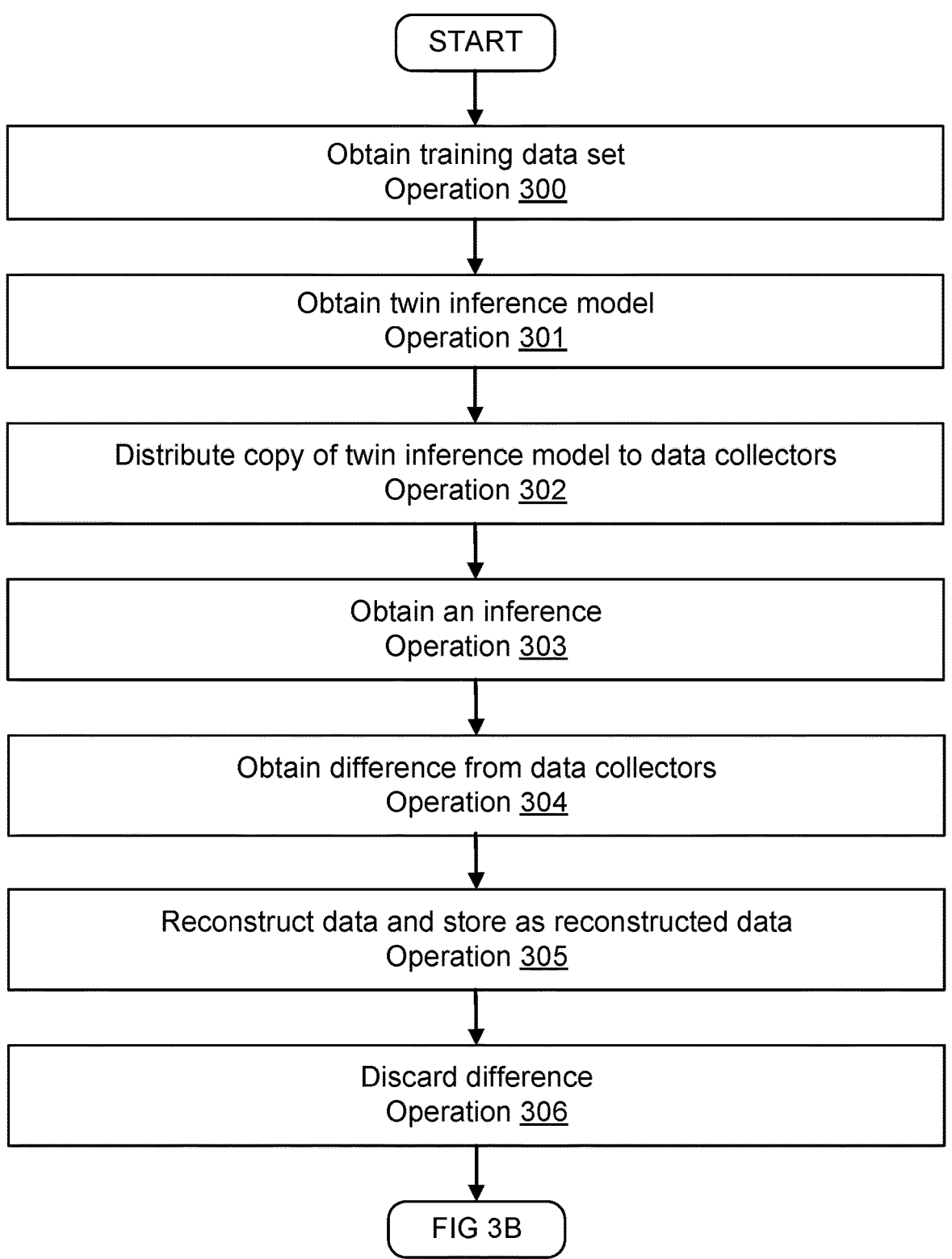
FIG. 3A shows a flow diagram illustrating a method of data collection via data reconstruction in accordance with an embodiment.
Figure 3B:
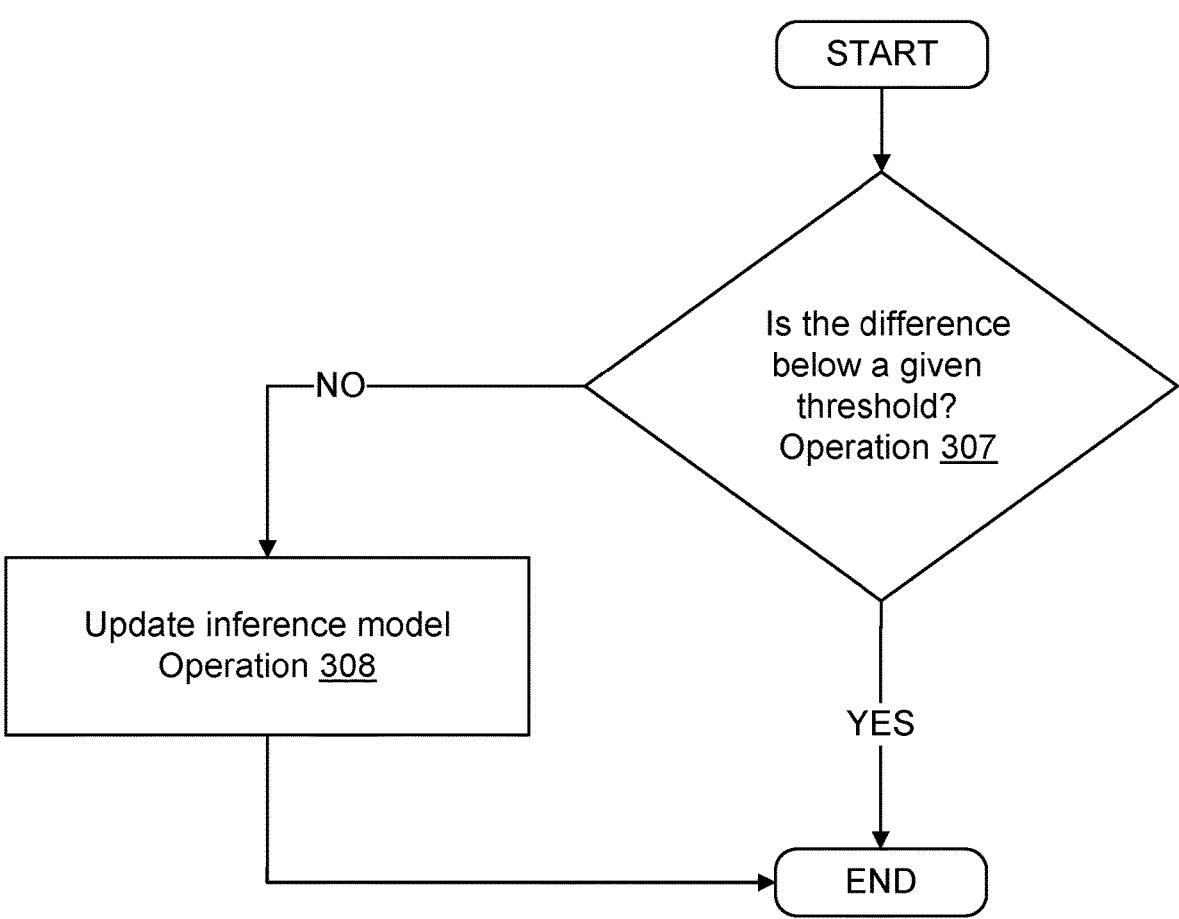
FIG. 3B shows a flow diagram illustrating a method of determining accuracy of a twin inference model in accordance with an embodiment.

When performing its functionality, data aggregator 102 may perform all, or a portion, of the methods and/or actions shown in FIGS. 3A-3B.

To provide its functionality, data collectors 100 may (i) obtain data based on a measurement of interest to the data aggregator or other entity, (ii) generate a difference, a difference being a reduced-size representation of the data, and (iii) transmit the difference to data aggregator 102. By doing so, data collectors 100 may transmit a reduced quantity of data to data aggregator 102 for data collection purposes thereby decreasing network bandwidth consumption over communication system 101.

To generate the difference, data collectors 100, like data aggregator, may host a second copy of the twin inference model. Consequently, both data collectors 100 and data aggregators 102 may have access to identical inferences without needing to distribute inferences via communication system 101. By doing so, a reduced quantity of data (e.g., in the form of differences) may be transmitted via communication system 101 and used in conjunction with the locally obtained inferences to reconstruct data obtained via various components of the system of FIG. 1.

Figure 3C:
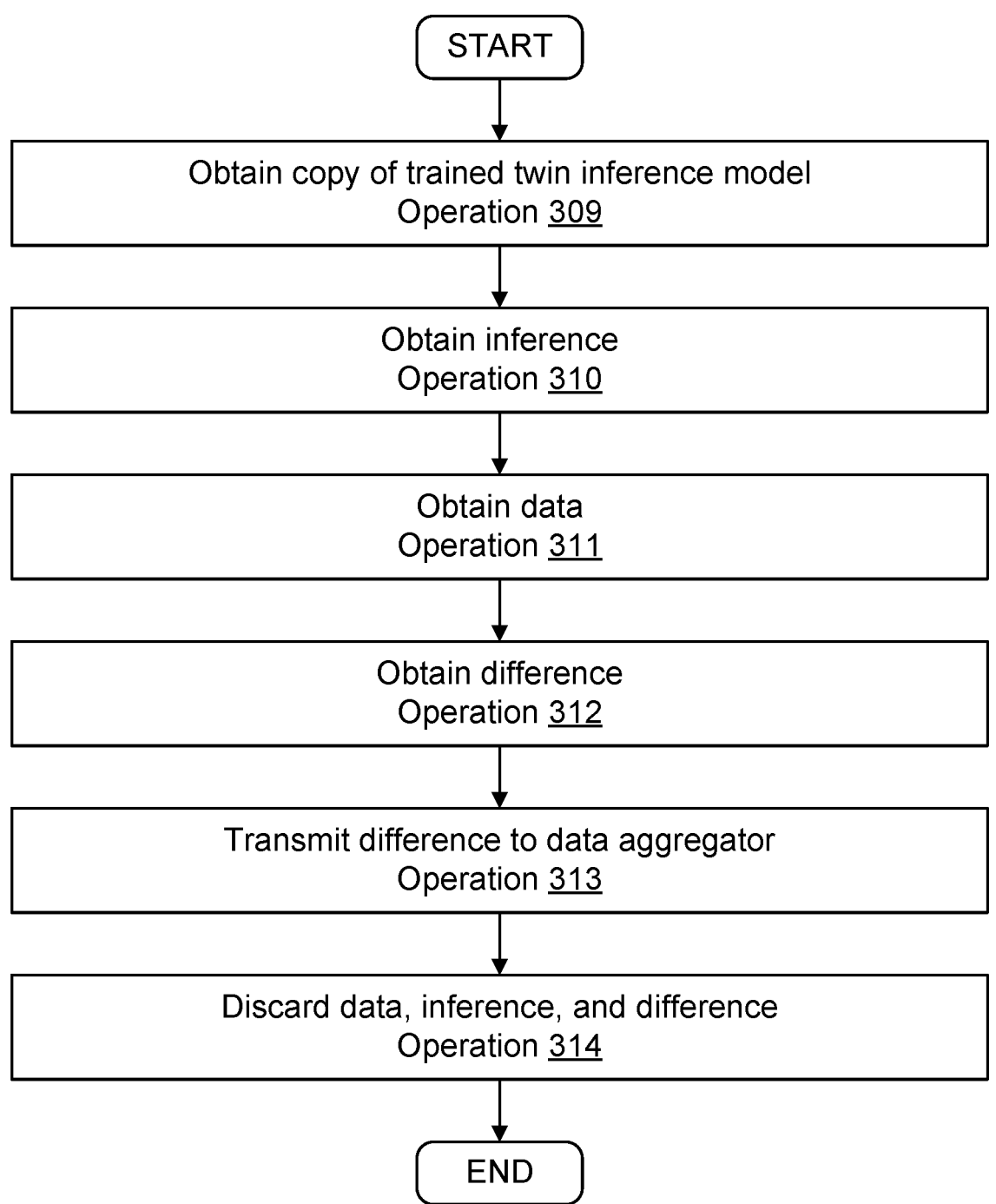
FIG. 3C shows a flow diagram illustrating a method of data collection in accordance with an embodiment.

When performing its functionality, data collectors 100 may perform all, or a portion, of the methods and/or actions shown in FIG. 3C.

Data collectors 100 and/or data aggregator 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data collectors 100 are implemented using an internet of things (IoT) device, which may include a computing device. The IoT device may operate in accordance with a communication model and/or management model known to the data aggregator 102, other data collectors, and/or other devices.

Any of the components illustrated in FIG. 1 may be operably connected to each other (and/or components not illustrated) with a communication system 101. In an embodiment, communication system 101 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Figure 2A:
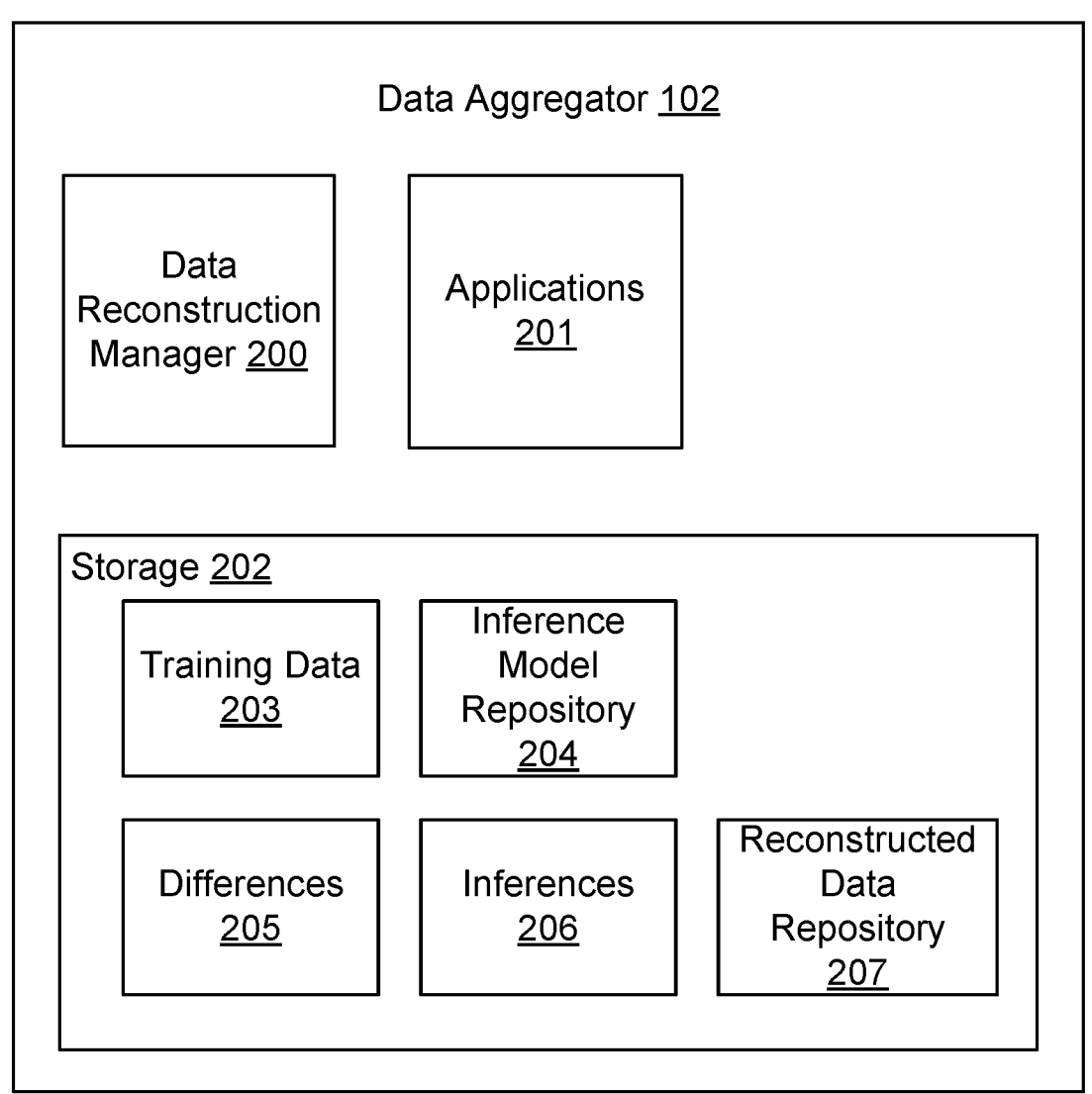
FIG. 2A shows a block diagram illustrating a data aggregator in accordance with an embodiment.

As discussed above, the system of FIG. 1 may include one or more data aggregators. Turning to FIG. 2A, a diagram of data aggregator 102 in accordance with an embodiment is shown. Data aggregator 102 may provide computer-implemented services that utilize data aggregated from various sources within a distributed environment. In order to do so, data aggregator 102 may utilize aggregated data without accessing (all of, or a portion thereof) data based on a series of measurements obtained by the sources (e.g., such as data collected by data collectors 100). By doing so, data transmission may be reduced and, therefore, communication bandwidth may be conserved. To provide its functionality, data aggregator 102 may include data reconstruction manager 200, applications 201, and/or storage 202. Each of these components is discussed below.

Data reconstruction manager 200 may (e.g., to provide all, or a portion, of the computer-implemented services) (i) obtain one or more twin inference models and store a copy of one or more twin inference models in inference model repository 204 (and/or other locations), (ii) distribute a copy of one or more twin inference models to sources throughout a distributed environment (e.g., data collectors 100) (iii) obtain one or more differences from sources throughout a distributed environment (e.g., from data collectors 100), (iv) obtain one or more inferences using inference models (e.g., those from inference model repository 204), (v) reconstruct data based on measurements performed by data collectors 100 using differences obtained from the data collector and inferences obtained from the copy of the twin inference models hosted by the data aggregator, (vi) delete differences from differences 205, (vii) determine whether the difference falls below a threshold, (viii) when the difference falls below a threshold, treat the twin inference models as accurate and store reconstructed data in reconstructed data repository 207, and/or (ix) when the difference falls outside a threshold, treat the twin inference models as inaccurate and perform corrective action to improve the accuracy of future inferences obtained by the twin inference models using training data 203 (and/or other data).

In an embodiment, data reconstruction manager 200 may obtain one or more twin inference models. In one scenario, data reconstruction manager 200 may obtain one or more twin inference models from some entity through a communication system (e.g., communication system 101). In another scenario, one or more twin inference models may be generated by data reconstruction manager 200 using training data. In the second scenario, training data may be fed into one or more predictive algorithms including, but not limited to, artificial neural networks, decision trees, support-vector machines, regression analysis, Bayesian networks, and/or genetic algorithms to generate one or more twin inference models. The inference models may be generated via other methods without departing from embodiments disclosed herein.

To generate a twin inference model, for example, a training data set may include a set of temperature measurements taken at various times in an industrial environment by one or more temperature sensors. Any of the above mentioned inference models (or other predictive algorithms) may be trained using this data set to predict future temperature measurements in the same environment. Data reconstruction manager 200 may use one copy of these trained twin inference models to obtain inferences intended to predict data based on measurements performed by data collectors (e.g., data collectors 100).

Copies of any number of twin inference models may be stored in the inference model repository 204 (and/or other locations). For example, some copies of twin inference models may be removed while others may be added. Consequently, the contents of inference model repository 204 may be updated over time to reflect more recent activity of data reconstruction manager 200.

In an embodiment, data reconstruction manager 200 may distribute copies of any number of twin inference models to sources (e.g., data collectors 100) throughout the distributed environment. By doing so, both data collectors 100 and data aggregator 102 may have access to identical inferences without needing to distribute inferences via communication system 101. Consequently, a reduced quantity of data (e.g., in the form of differences) may be transmitted via communication system 101 and used in conjunction with the locally obtained inferences to reconstruct data obtained via measurements performed by data collectors (e.g., data collectors 100).

In an embodiment, data reconstruction manager 200 may obtain one or more differences from sources throughout a distributed environment (e.g., data collectors 100). A difference may be any reduced-size representation of data based on: (i) a measurement performed by a data collector (e.g., data collector 100A) and (ii) an inference obtained by the data collector (e.g., data collector 100A). The inference used to obtain the difference may be generated by a copy of a twin inference model hosted by the data collector (e.g., data collector 100A) and obtained from data aggregator 102 (and/or from other sources). The inference used to obtain the difference may be intended to match the data obtained via a measurement performed by a data collector (e.g., data collector 100A).

For example, one data collector may be a temperature sensor positioned in an industrial environment to monitor the temperature of that environment. The data collector may perform a measurement and collect a temperature reading at a given time ($t_1$) of 5.1° C. The data collector may obtain a temperature inference using a copy of a twin inference model intended to predict the temperature reading at $t_1$ performed by the temperature sensor. The temperature inference obtained by the temperature sensor may be 4.9° C.

Continuing with the above example, the temperature sensor may perform a data minimization step in order to decrease the bits needed to represent the data and, therefore, decrease the amount of data transmitted across communication system 101 during data collection. One example of a data minimization step may be data compression. For example, different binary sequences may compress to different numbers of bits. The temperature reading may have the following binary sequence: 11010011. Compressing the temperature reading binary sequence may result in 8 bits of information transmitted over communication system 101. The temperature inference may have the following binary sequence: 10010011. Compressing the temperature inference may also result in 8 bits of information transmitted over communication system 101. In order to reduce the size of the transmission, the temperature sensor may utilize the following formula to generate a temperature difference binary sequence: temperature difference binary sequence=temperature reading binary sequence—temperature inference binary sequence (e.g., bit-wise difference operation). Therefore, the temperature sensor may calculate the temperature difference binary sequence as 01000000. Compressing the temperature difference binary sequence may result in 3 bits of information transmitted over communication system 101. Therefore, data reconstruction manager 200 may obtain 3 bits of information rather than 8 from the temperature sensor during data collection. Consequently, the amount of data transmitted over communication system 101 may be minimized and, therefore, network bandwidth and power consumption may be reduced.

In an embodiment, in order to further reduce data transmission, any transmitted differences may be subject to quantization to reduce the quantity of bits necessary to transmit the difference. For example, the difference may be rounded to whole integers, the nearest tenth, etc. By doing so, fewer bits may be needed to be transmitted to represent the quantized difference.

In an embodiment, data reconstruction manager 200 may treat the difference as a value difference, in which the numerical value of the measurement and inference may be subtracted rather than the bit sequences. Using the example values given above, the temperature reading may be 5.1° C. and the temperature inference may be 4.9° C. The temperature reading may have the following binary sequence:

11010011. Compressing the temperature reading binary sequence may result in 8 bits of information transmitted over communication system 101. In order to reduce the size of the transmission, the temperature sensor may utilize the following formula to generate a temperature difference: temperature difference=temperature reading—temperature inference. Therefore, the temperature sensor may calculate the temperature difference as 0.2° C. by subtracting 4.9° C. from 5.1° C. The temperature difference may have the following binary sequence: 00000001. Compressing the temperature difference binary sequence may result in 3 bits of information transmitted over communication system 101. Therefore, data reconstruction manager 200 may obtain 3 bits of information rather than 8 from the temperature sensor during data collection. Consequently, the amount of data transmitted over communication system 101 may be minimized and, therefore, network bandwidth and power consumption may be reduced. Differences may be obtained via other methods without departing from embodiments disclosed herein.

In an embodiment, data reconstruction manager 200 may obtain one or more inferences using the copy of the twin inference model described above. The twin inference model may be used to predict data obtained via measurements performed by a data collector (e.g., data collector 100A). The data aggregator and the data collector may each host an identical copy of the twin inference model and, therefore, may generate identical inferences.

Continuing with the above example, the copy of the twin inference model hosted by the data aggregator may generate the following temperature inference for a given time ($t_1$): 4.9° C. (identical to the temperature inference generated by the temperature sensor). The data aggregator may use this temperature inference and the difference obtained from the temperature sensor to reconstruct the original temperature reading performed by the temperature sensor as described below.

In an embodiment, data reconstruction manager 200 may reconstruct data from data collectors 100 using: (i) differences obtained from the data collector and (ii) inferences generated by the copy of the twin inference model hosted by the data aggregator. Continuing with the above example, the data aggregator may obtain 3 bits of information from the temperature sensor. The data aggregator may perform a data expansion step in order to obtain the temperature difference bit sequence of 01000000. The data aggregator may then use the formula described above (temperature difference bit sequence=temperature reading bit sequence—temperature inference bit sequence) to obtain the temperature reading bit sequence by adding the temperature difference bit sequence to the temperature inference bit sequence. Therefore, the data aggregator is able to obtain an exact bit sequence from the temperature sensor without exchanging any temperature bit sequences over communication system 101. By doing so, the communication network bandwidth may be conserved and power consumption due to data transmission may be reduced throughout the distributed environment. In an embodiment, the data reconstruction manager 200 may treat the difference as a value difference, as discussed above, and may the reconstruction via value-based operations rather than on the bit sequences.

In an embodiment, data reconstruction manager 200 may determine whether the difference falls below a threshold. The threshold may be any static or dynamic threshold, may be set by a user, and/or may be obtained from another entity through a communication system (e.g., communication system 101). For example, the threshold may be 5 bits. Therefore, any difference transmitted to data aggregator 102 containing 5 bits or less (e.g., the data minimized version of the difference that may be transmitted) may fall below the threshold. In contrast, any difference transmitted to data aggregator 102 containing more than 5 bits may fall outside the threshold. The threshold may be intended to limit the amount of data transmitted over communication system 101 during data collection.

Continuing with the above example, the difference obtained by the data aggregator may include 3 bits of information. The threshold for differences in this scenario may be 5 bits. Therefore, the difference falls below the threshold, the twin inference models may be determined accurate, and the temperature reading reconstructed from the temperature sensor may be stored in reconstructed data repository 207.

In a second scenario, the difference obtained by data reconstruction manager 200 may include 8 bits of information. Therefore, the difference may fall outside the threshold of 5 bits of information and the twin inference models may be determined inaccurate. Inaccurate twin inference models may indicate that the twin inference models require re-training in order to increase accuracy of future inferences. Data reconstruction manager 200 may obtain at least a portion of a series of measurements from the temperature sensor and/or data from reconstructed data repository 207 in order to re-train the twin inference models.

Applications 201 may consume data from reconstructed data repository 207 to provide computer-implemented services to users of data aggregator 102 and/or other computing devices operably connected to data aggregator 102. The computer-implemented services may include any type and quantity of services which may utilize, at least in part, data aggregated from a variety of sources (e.g., data collectors 100) within a distributed environment.

For example, applications 201 may use the aggregated data to modify industrial manufacturing processes; to sound alerts for undesired operation of systems, locations of persons in an environment; and/or for any other type of purpose. Consequently, applications 201 may perform various actions (e.g., action sets) based on the data in reconstructed data repository 207.

In an embodiment, one or more of data reconstruction manager 200 and applications 201 is implemented using a hardware device including circuitry. The hardware device may be, for example, a digital signal processor, a field programmable gate array, or an application specific integrated circuit. The circuitry may be adapted to cause the hardware device to perform the functionality of data reconstruction manager 200 and/or applications 201. One or more of data reconstruction manager 200 and applications 201 may be implemented using other types of hardware devices without departing from embodiments disclosed herein.

In an embodiment, one or more of data reconstruction manager 200 and applications 201 is implemented using a processor adapted to execute computing code stored on a persistent storage that when executed by the processor performs the functionality of data reconstruction manager 200 and/or applications 201 discussed throughout this application. The processor may be a hardware processor including circuitry such as, for example, a central processing unit or a microcontroller. The processor may be other types of hardware devices for processing digital information without departing from embodiments disclosed herein.

When providing its functionality, data reconstruction manager 200 and/or applications 201 may perform all, or a portion, of the operations and/or actions discussed with respect to FIGS. 3A-3B.

When providing its functionality, data reconstruction manager 200 and/or applications 201 may store data and use data stored in storage 202

In an embodiment, storage 202 is implemented using physical devices that provide data storage services (e.g., storing data and providing copies of previously stored data). The devices that provide data storage services may include hardware devices and/or logical devices. For example, storage 202 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 202 may include a memory device (e.g., a dual in line memory device) in which data is stored and from which copies of previously stored data are provided. In another example, storage 202 may include a persistent storage device (e.g., a solid-state disk drive) in which data is stored and from which copies of previously stored data is provided. In a still further example, storage 202 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 202 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 202 may store data structures including, for example, training data 203, inference model repository 204, differences 205, inferences 206, and reconstructed data repository 207. Any of these data structures is usable by components of the system in FIG. 1. Any of these data structures may be implemented using, for example, lists, tables, databases, linked lists, and/or other type of data structures. Any of the data structures may be shared, spanned across multiple devices, and may be maintained and used by any number of entities. Additionally, while illustrated as including a limited amount of specific data, any of these data structures may include additional, less, and/or different data without departing from embodiments disclosed herein. Each of these data structures is discussed below.

In an embodiment, training data 203 may include training data usable to train a machine learning model (and/or other types of inference-generation models). Training data 203 may be obtained from various sources throughout a distributed environment (e.g., from data collectors 100) and may include (all of, or a portion thereof) a series of measurements representing an ambient environment and/or other types of measurements.

For example, training data 203 may include a set of temperature measurements taken at different times in an industrial environment by one or more temperature sensors. Temperature sensors may collect a set of temperature measurements at different times over any period of time. For example, one temperature sensor may record the following data over the course of one hour: $T_1 = 5.2°$ C., $T_2 = 5.2°$ C., $T_3=5.0°$ C., $T_4=5.1°$ C., $T_5=4.9°$ C. These temperature measurements may be temporarily or permanently stored by the temperature sensor and transmitted to a central temperature control system when requested for purposes of training a machine-learning model to predict future temperature measurements in the same environment (and/or other purposes).

In an embodiment, inference model repository 204 includes copies of one or more twin inference models. One copy of each twin inference model may be hosted by data aggregator 102, while another identical copy of each twin inference model may be hosted by one or more sources (e.g., data collectors 100) throughout a distributed environment. The twin inference models may be obtained by feeding training data 203 into a machine learning e.g., a deep learning) model to predict data based on measurements performed by data collectors 100 (and/or other sources) without having access to the measurements. Consequently, data aggregator 102 and each source (e.g., data collector) throughout a distributed environment may have access to identical inferences generated by copies of the twin inference models.

For example, any number of temperature sensors throughout a distributed environment may record temperature measurements at various time intervals. Over any period of time, these temperature measurements may be collected and transmitted to a central temperature control system. The central temperature control system may utilize the set of temperature measurements for the purpose of training a machine-learning model to predict future temperature measurements in the same environment (and/or for other purposes) thereby obtaining a twin machine-learning model (which may be distributed to one or more of the temperature sensors).

The central temperature control system may train the twin machine-learning model to predict a temperature value at a specific time. For example, the copy of the twin inference model hosted by the data aggregator may predict a value of $5.1°$ C. at $t_{12}$ without obtaining any temperature measurements from the temperature sensor. Consequently, the copy of the twin inference model hosted by the temperature sensor may have access to an identical inference of $5.1°$ C. at $t_{12}$ and may use this inference to obtain a temperature difference as described below.

Differences 205 may include any number of differences obtained from various sources within a distributed environment (e.g., data collectors 100). A difference may be any reduced-size representation of data based on a measurement performed by a data collector (e.g., data collector 100A). The difference may be based on: (i) data obtained via a measurement performed by a data collector (e.g., data collector 100A) and (ii) an inference generated by the data collector (e.g., data collector 100A using a twin inference model). The inference used to obtain the difference may be generated by a copy of a twin inference model hosted by the data collector (e.g., data collector 100A) and obtained from data aggregator 102. The inference used to obtain the difference may be intended to match the data obtained via a measurement performed by a data collector (e.g., data collector 100A).

For example, one data collector may be a temperature sensor positioned in an industrial environment to monitor the temperature of the environment. The data collector may perform a measurement and collect a temperature reading at a given time ($t_1$) of $5.1°$ C. The data collector may obtain a temperature inference using a copy of a twin inference model intended to predict the temperature reading at $t_1$ performed by the temperature sensor. The temperature inference obtained by the temperature sensor may be $4.9°$ C.

Continuing with the above example, the temperature sensor may perform a data minimization step in order to decrease the bits needed to represent the data and, therefore, decrease the amount of data transmitted across communication system 101 during data collection. One example of a data minimization step may be data compression. For example, different binary sequences may compress to different numbers of bits. The temperature reading may have the following binary sequence: 11010011. Compressing the temperature reading binary sequence may result in 8 bits of information transmitted over communication system 101. The temperature inference may have the following binary sequence: 10010011. Compressing the temperature inference may also result in 8 bits of information transmitted over communication system 101. In order to reduce the size of the transmission, the temperature sensor may utilize the following formula to generate a temperature difference binary sequence: temperature difference binary sequence=temperature reading binary sequence—temperature inference binary sequence (e.g., bit-wise difference). Therefore, the temperature sensor may calculate the temperature difference binary sequence as 01000000. Compressing the temperature difference binary sequence may result in 3 bits of information transmitted over communication system 101. Therefore, data reconstruction manager 200 may obtain 3 bits of information rather than 8 from the temperature sensor during data collection. Consequently, the amount of data transmitted over communication system 101 may be minimized and, therefore, network bandwidth and power consumption may be reduced. Differences may be obtained via other methods (including value-based calculations as described previously) without departing from embodiments disclosed herein.

Inferences 206 may include any number of inferences obtained by data reconstruction manager 200. The inferences may be generated by a copy of a twin inference model from inference model repository 204. The twin inference models may be obtained by feeding training data 203 into a machine learning (e.g., a deep learning) model. In an embodiment, a deep learning-based model is used to predict future measurements collected by data collectors 100 without having access to the series of measurements. Data aggregator 102 and data collectors 100 may host identical copies of a twin inference model and, therefore, may have access to identical inferences. The inferences may be, for example, predictions of temperature readings collected by a temperature sensor at various times. The inferences may be other types of predictions without departing from embodiments disclosed herein.

In an embodiment, reconstructed data repository 207 may include any amount of reconstructed data obtained by data reconstruction manager 200. Data based on measurements performed by data collectors (e.g., data collectors 100) may be reconstructed by data reconstruction manager 200 without data reconstruction manager 200 having access to the measurements performed by the data collectors. Data reconstruction may be performed using (i) a difference obtained by data aggregator 102 and (ii) an inference obtained by data aggregator 102 using a copy of a twin inference model.

For example, data aggregator 102 may obtain a difference from a temperature sensor including 4 bits of information. Data aggregator 102 may perform a data expansion step to access the bit sequence for this data. The bit sequence may be 00000001, which may correspond to a difference of $0.3°$ C. Data aggregator 102 may obtain an inference of $5.0°$ C.

from a copy of a twin inference model hosted by the data aggregator. In this scenario, the temperature sensor may host an identical copy of the twin inference model and may have access to an identical temperature inference. The temperature difference obtained from the temperature sensor may be based on the identical temperature inference, which may allow the data aggregator to obtain the exact value of the temperature measurement.

In order to obtain the exact value of the temperature measurement, the data aggregator may utilize the following formula: temperature difference=temperature measurement—temperature inference (e.g., value difference). Therefore, the data aggregator may calculate a temperature measurement of 5.3° C. by adding the temperature inference and the temperature difference. The data aggregator may store this temperature measurement in reconstructed data repository 207. By performing this process, the data aggregator may have access to the exact temperature measurement performed by the temperature sensor without transmitting actual temperature measurements across communication system 101. Differences may also be obtained using a bit-wise calculation as described previously, or by other methods without departing from embodiments disclosed herein. By transmitting the compressed difference, a reduced amount of data may be transmitted across communication system 101 and, therefore, network bandwidth and power consumption may be minimized throughout the distributed environment.

While illustrated in FIG. 2A as including a limited number of specific components, a data aggregator in accordance with an embodiment may include fewer, additional, and/or different components than shown in FIG. 2A.

Figure 2B:
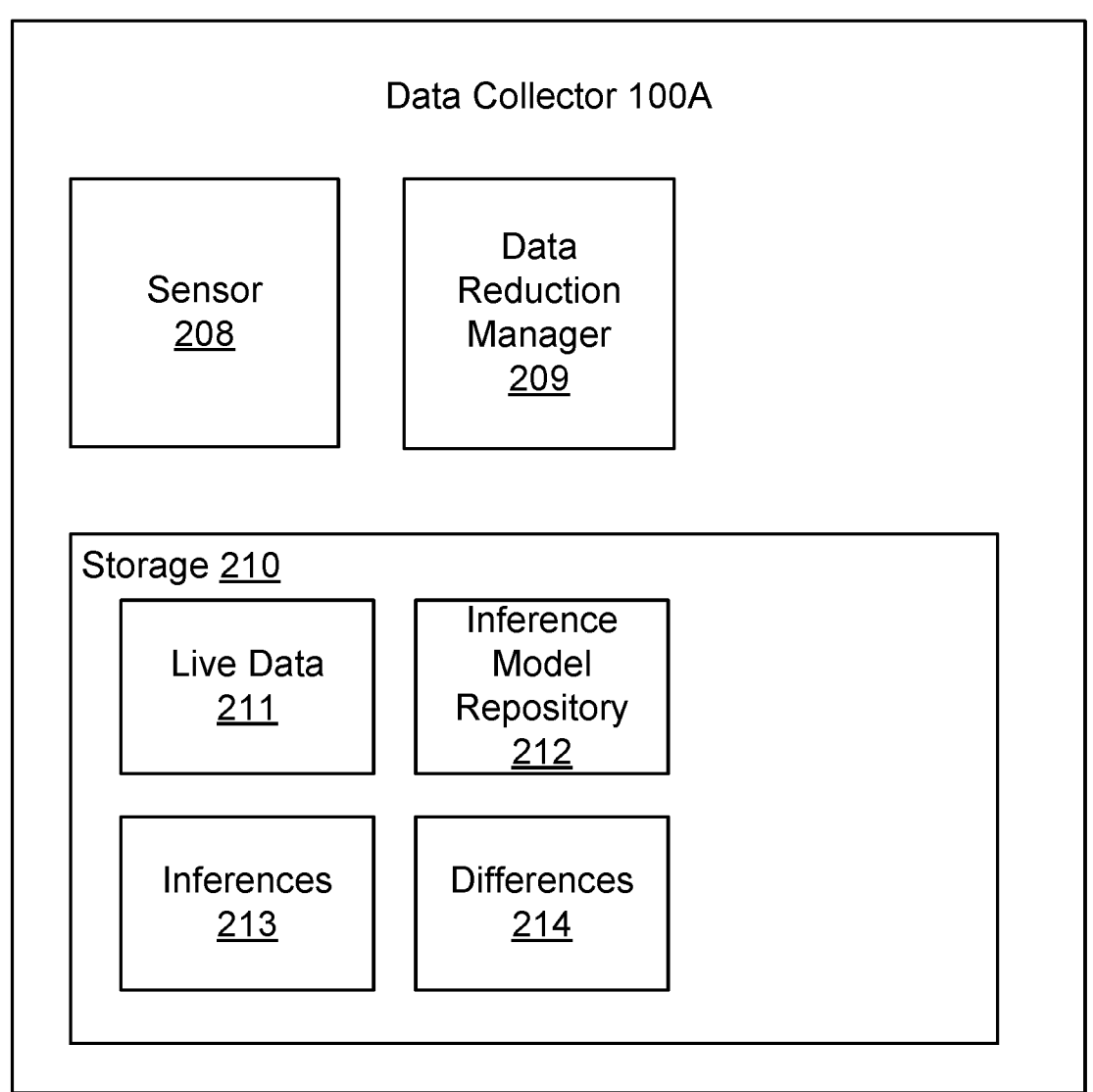
FIG. 2B shows a block diagram illustrating a data collector in accordance with an embodiment.

As discussed above, the system of FIG. 1 may include one or more data collectors (e.g., data collectors 100A-100N). Turning to FIG. 2B, a diagram of data collector 100A in accordance with an embodiment is shown. Data collector 100A may provide data collection services to users and/or other computing devices operably connected to data collector 100A. The data collection services may include any type and quantity of services including, for example, temperature data collection, pH data collection, humidity data collection, etc.

Following data collection, data collector 100A may generate a difference (a reduced-size representation) of a measurement using: (i) data obtained via a measurement performed by data collector 100A and (ii) an inference generated by data collector 100A obtained using a copy of a twin inference model hosted by data collector 100A. The inference used to obtain the difference may be intended to match the data obtained via a measurement performed by data collector 100A. Data collector 100A may transmit this reduced-size difference to data aggregator 102 instead of the data obtained via a measurement performed by data collector 100A. By doing so, the amount of data transmitted throughout a distributed environment may be reduced, which may lead to a reduction in communication bandwidth consumption and energy consumption throughout the environment. To provide its functionality, data collector 100A may include sensor 208, data reduction manager 209, and storage 210. Each of these components is described below.

Sensor 208 may obtain a series of measurements representing a characteristic of an ambient environment. For example, sensor 208 may be a temperature sensor positioned in an industrial environment to obtain temperature measurements at various time intervals over the course of each hour. For example, sensor 208 may obtain the following series of measurements over the course of the first hour of data collection: $T_1$=5.1° C., $T_2$=4.8° C., $T_3$=5.1° C., $T_4$=5.0° C., $T_5$=4.9° C. Sensor 208 may store at least a portion of these measurements in storage 210 (and/or other locations).

Data reduction manager 209 may (e.g., to provide all, or a portion, of the data collection services): (i) obtain live data from storage 210 (and/or other locations), (ii) obtain a copy of one or more trained twin inference models and store the copies in inference model repository 212 (and/or other locations), (iii) obtain one or more inferences using inference models (e.g., those from inference model repository 204), (iv) obtain one or more differences using live data from storage 210 and inferences obtained from inference models (e.g., those from inference model repository 204), (v) transmit one or more differences to data aggregator 102, (vi) discard live data, inferences, and differences from storage 210 when no longer needed, and (vii) respond to commands received from data aggregator 102.

In an embodiment, data reduction manager 209 may obtain a copy of one or more trained twin inference models from data aggregator 102 (and/or from other sources). One copy of each twin inference model may be hosted by data aggregator 102, while another identical copy of each twin inference model may be hosted by data collector 100A. Therefore, the data aggregator and data collector may have access to identical inferences generated by the copies of the trained twin inference model. Refer to the description of FIG. 2A for additional details regarding the training of twin inference models.

In an embodiment, data reduction manager 209 may obtain one or more inferences using the copy of the twin inference model described above. The twin inference model may be used to predict data obtained via measurements performed by a data collector (e.g., data collector 100A). The data aggregator and the data collector may each host an identical copy of the twin inference model and, therefore, may generate identical inferences.

For example, data collector 100A may be a temperature sensor positioned in an industrial environment to monitor the temperature of that environment. The copy of the twin inference model hosted by the temperature sensor may generate the following temperature inference for a given time: 4.9° C. (identical to the temperature inference generated by data aggregator 102). The temperature sensor may use this temperature inference to obtain a temperature difference as described below.

In an embodiment, data reduction manager 209 may obtain one or more differences using live data from storage 210 and inferences obtained from inference models (e.g., those from inference model repository 204). A difference may be any reduced-size representation of data based on: (i) a measurement performed by a data collector (e.g., data collector 100A) and (ii) an inference obtained by the data collector (e.g., data collector 100A). The inference used to obtain the difference may be generated by the copy of the twin inference model hosted by the data collector (e.g., data collector 100A) as described above. The inference used to obtain the difference may be intended to match the data obtained via a measurement performed by a data collector (e.g., data collector 100A).

Continuing with the above example, the data collector may perform a measurement and collect a temperature reading at a given time ($t_1$) of 5.1° C. The data collector may obtain a temperature inference using a copy of a twin inference model intended to predict the temperature reading at $t_1$ performed by the temperature sensor. The temperature inference obtained by the temperature sensor may be 4.9° C.

The temperature sensor may perform a data minimization step in order to decrease the bits needed to represent the data and, therefore, decrease the amount of data transmitted across communication system 101 during data collection. One example of a data minimization step may be data compression. For example, different binary sequences may compress to different numbers of bits. The temperature reading may have the following binary sequence: 11010011. Compressing the temperature reading binary sequence may result in 8 bits of information transmitted over communication system 101. The temperature inference may have the following binary sequence: 10010011. Compressing the temperature inference may also result in 8 bits of information transmitted over communication system 101. In order to reduce the size of the transmission, the temperature sensor may utilize the following formula to generate a temperature difference binary sequence: temperature difference binary sequence=temperature reading binary sequence—temperature inference binary sequence. Therefore, the temperature sensor may calculate the temperature difference binary sequence as 01000000. Compressing the temperature difference binary sequence may result in 3 bits of information transmitted over communication system 101. Therefore, data reconstruction manager 200 may obtain 3 bits of information rather than 8 from the temperature sensor during data collection. Consequently, the amount of data transmitted over communication system 101 may be minimized and, therefore, network bandwidth and power consumption may be reduced. Differences may be calculated via other methods without departing from embodiments disclosed herein. Refer to FIG. 2A for additional information regarding the calculation of differences.

In an embodiment, data reduction manager 209 may transmit one or more differences to data aggregator 102. Data reduction manager 209 may transmit one or more differences at time intervals designated by a user and/or another entity through a communication system (e.g., communication system 101). For example, data reduction manager 209 may transmit a temperature difference to data aggregator 102 once every minute.

In an embodiment, data reduction manager 209 may respond to commands from data aggregator 102. In a first scenario, data aggregator 102 may request a difference at specific time intervals from data reduction manager 209. In a second scenario, data aggregator 102 may also request at least a portion of a series of measurements from data collector 100A for purposes of training or re-training inference models (and/or other purposes).

In an embodiment, one or more of sensor 208 and data reduction manager 209 is implemented using a hardware device including circuitry. The hardware device may be, for example, a digital signal processor, a field programmable gate array, or an application specific integrated circuit. The circuitry may be adapted to cause the hardware device to perform the functionality of sensor 208 and/or data reduction manager 209. One or more of sensor 208 and data reduction manager 209 may be implemented using other types of hardware devices without departing from embodiments disclosed herein.

In an embodiment, one or more of sensor 208 and data reduction manager 209 is implemented using a processor adapted to execute computing code stored on a persistent storage that when executed by the processor performs the functionality of sensor 208 and/or data reduction manager 209 discussed throughout this application. The processor may be a hardware processor including circuitry such as, for example, a central processing unit or a microcontroller. The processor may be other types of hardware devices for processing digital information without departing from embodiments disclosed herein.

In an embodiment, sensor 208 and/or data reduction manager 209 may utilize a physical device (e.g., a sensor) used to measure a characteristic of an ambient environment in order to perform the functionality of sensor 208 and/or data reduction manager 209. For example, a temperature sensor may utilize one or more thermistors, thermocouples, and/or resistance temperature detectors to collect temperature data. In a second example, a pH sensor may utilize any number of electrodes to collect pH data. The sensor may include other types of hardware devices for measuring a characteristic of an ambient environment without departing from embodiments disclosed herein.

When providing their functionality, sensor 208 and data reduction manager 209 may perform all, or a portion, of the operations and/or actions discussed with respect to FIG. 3C.

When providing its functionality, data reduction manager 209 may store data and use data stored in storage 210.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 210 may store data structures including, for example, live data 211, inference model repository 212, inferences 213, and differences 214. Any of these data structures is usable by components of the system in FIG. 1. Any of these data structures may be implemented using, for example, lists, tables, databases, linked lists, and/or other type of data structures. Any of the data structures may be shared, spanned across multiple devices, and may be maintained and used by any number of entities. Additionally, while illustrated as including a limited amount of specific data, any of these data structures may include additional, less, and/or different data without departing from embodiments disclosed herein. Each of these data structures is discussed below.

In an embodiment, live data 211 includes live data measurements collected by sensor 208. For example, live data 211 may include temperature measurements recorded by a temperature sensor at various time intervals. A series of temperature measurements may include the following five measurements taken over the course of one hour: $T_1=5.5°$ C., $T_2=5.0°$ C., $T_3=5.0°$ C., $T_4=5.1°$ C., $T_5=5.2°$ C. Any amount of measurements may be stored temporarily and/or permanently in live data 211 (and/or other locations). For example, some measurements may be removed while others may be added. Consequently, the contents of live data 211 may be updated over time to reflect more recent activity of data reduction manager 209.

In an embodiment, inference model repository 212 includes copies of one or more twin inference models. One copy of each twin inference model may be hosted by data collector 100A, while another identical copy of each twin inference model may be hosted by data aggregator 102. The twin inference models may be obtained by a data aggregator, as discussed above, by feeding training data 203 into a machine learning e.g., a deep learning) model to predict data based on measurements performed by data collectors 100 (and/or other sources) without having access to the measurements. Therefore, data aggregator 102 and each source (e.g., data collector) throughout a distributed environment may have access to identical inferences generated by copies of the twin inference models after the aggregator distributes the twin inference models. For additional information regarding the training of twin inference models, see the description of FIG. 2A. Any number of copies of twin inference models may be stored temporarily or permanently in inference model repository 204 (and/or other locations). For example, some copies of twin inference models may be removed while others may be added. Consequently, the contents of inference model repository 204 may be updated over time to reflect more recent activity of data reduction manager 209.

In an embodiment, inferences 213 may include any number of inferences obtained by data reduction manager 209. The inferences may be generated by a copy of a twin inference model from inference model repository 212 as described above. The inferences may be, for example, predictions of temperature readings collected by a temperature sensor at various times. For example, the copy of the twin inference model hosted by the data collector may predict a temperature reading of 5.1° C. at a specified time. The inferences may be other types of predictions without departing from embodiments disclosed herein. Any number of inferences may be stored temporarily or permanently in inferences 213 (and/or other locations). For example, some inferences may be removed while others may be added. Consequently, the contents of inferences 213 may be updated over time to reflect more recent activity of data reduction manager 209.

In an embodiment, differences 214 may include any number of differences obtained by data collector 100A (and/or from other sources). A difference may be any reduced-size representation of data based on a measurement performed by a data collector (e.g., data collector 100A). The difference may be based on: (i) data obtained via a measurement performed by a data collector (e.g., data collector 100A) and (ii) an inference generated by the data collector (e.g., data collector 100A). Refer to the description of FIG. 2A for details and examples regarding the calculation of differences. Any number of differences may be stored temporarily or permanently in differences 214 (and/or other locations). For example, some differences may be removed while others may be added. Consequently, the contents of differences 214 may be updated over time to reflect more recent activity of data reduction manager 209.

While illustrated in FIG. 2B as including a limited number of specific components, a data collector in accordance with an embodiment may include fewer, additional, and/or different components than shown in FIG. 2B.

As discussed above, the components of FIG. 1 may perform various methods to utilize data aggregated from various sources throughout a distributed environment. FIGS. 3A-3C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of data collection via data reconstruction in accordance with an embodiment is shown.

At operation 300, a training data set is obtained. The training data set may include any quantity and type of data. For example, the training data set may include a series of measurements representing an ambient environment (e.g., temperature data, humidity data, pH data).

In an embodiment, the training data set may be obtained from any number of data collectors (e.g., data collectors 100) throughout a distributed environment. For example, requests for the data may be sent to the data collectors and the data collectors may provide the data to the data aggregator in response to the requests. Such messages and/or data may be passed via a communication system operably connecting the data collector and the data aggregator.

In an embodiment, the training data set may be provided by another entity through a communication system. For example, the training data may be obtained by data collectors throughout a second distributed environment with a similar environment. This training data set may be provided to any number of data aggregators in any number of distributed environments.

At operation 301, a twin inference model is obtained. The twin inference model may be implemented with, for example, a machine learning model. The twin inference model may generate inferences that predict future data obtained by data collectors without having access to the data obtained by the data collectors.

In an embodiment, the twin inference model is obtained by the data aggregator using a training data set. The training data set may be fed into a machine learning model (and/or other type of inference generation model) to obtain the inference model to predict future measurements from data collectors.

In an embodiment, the twin inference model may also be obtained from another entity through a communication system. For example, a twin inference model may be obtained by another entity through training a twin machine learning model and providing the trained twin machine learning model to the data aggregator. In this scenario, the twin inference model obtained via another entity may or may not require training by the data aggregator.

At operation 302, a copy of the twin inference model is distributed to various sources throughout the distributed environment (e.g., data collectors 100). Each copy of a twin inference model may generate identical inferences. Therefore, throughout the distributed environment, data aggregator 102 and each source hosting a copy of the twin inference model may obtain identical inferences throughout the process of data collection (and/or other processes).

In an embodiment, the copy of the trained twin inference model may be distributed by data aggregator 102 to data collectors 100 throughout the distributed environment via a communication system (e.g., communication system 101). For example, a copy of the trained twin inference model may be distributed to various data collectors by data aggregator 102 as part of the process of setting up a new distributed environment for data collection (and/or other purposes). In addition, a copy of the trained twin inference model may be distributed to various data collectors by data aggregator 102 as part of the process of adding or replacing one or more data collectors in a distributed environment.

At operation 303, an inference is obtained. The inference may be generated using the trained twin inference model. The inference may be a prediction of data based on measurements performed by a data collector throughout a distributed environment. The inference may be generated without the data aggregator having access to the measurements from the data collector.

In an embodiment, the inference is generated by the copy of the twin inference model hosted by the data aggregator. In a second scenario, the inference may be generated by a copy of the twin inference model hosted by another entity (e.g., a second data aggregator) and transmitted to data aggregator 102 via a communication system (e.g., communication system 101).

At operation 304, a difference is obtained from the data collector. The difference may be any reduced-size representation of data (which the inference model attempts to predict) based on: (i) a measurement performed by the data collector and (ii) an inference generated by the data collector using a copy of a twin inference model hosted by the data collector. Refer to FIG. 2A for more details and examples regarding differences.

In an embodiment, any number of differences may be obtained from any number of data collectors throughout a distributed environment. For example, requests for the differences may be sent to the data collectors and the data collectors may provide the differences to the data aggregator in response to the requests. Such messages and/or data may be passed via a communication system operably connecting the data collector and the data aggregator.

In an embodiment, the differences may be provided by the data collectors to the data aggregator. The data collectors may be programmed to provide differences at established time intervals, at varying time intervals, and/or via other modalities. For example, the data collectors may be programmed to provide a difference once every minute, every hour, every day, etc.

In additional to the differences, various types and quantity of metadata may be provided. The metadata may include, for example, time periods associated with the differences, indicators of which twin inference model was used to obtain the difference, information regarding processes used to obtain measurements used as a basis for a difference, etc.

At operation 305, data is reconstructed and stored as reconstructed data. In order to reconstruct data, the data aggregator utilizes: (i) the difference obtained from the data collector (and/or other sources) and (ii) the inference obtained by the copy of the twin inference model hosted by the data aggregator. The inference obtained by the data aggregator may be identical to the inference used by the data collector to obtain the difference. As a result, data reconstructed by the data aggregator may be an exact copy of data based on measurements performed by the data collector. Therefore, the data aggregator may perform data collection without directly obtaining measurements from the data collector. By doing so, data collectors 100 may transmit a reduced quantity of data to data aggregator 102 thereby decreasing network bandwidth consumption over communication system 101.

At operation 306, the difference is discarded. Differences may be discarded by data aggregator 102 following the process of data reconstruction. Differences may be discarded in order to reduce storage consumption by the data aggregator.

As discussed below, the amount of information stored in the difference may be used by data aggregator 102 to determine accuracy of the twin inference model.

Turning to FIG. 3B, a flow diagram illustrating a method of determining accuracy of a twin inference model in accordance with an embodiment is shown. FIG. 3B may be a continuation of the method illustrated in 3A.

At operation 307, it is determined whether the difference falls below an established threshold (or a dynamically determined threshold, or other type of metric). The threshold may be obtained from a user, from another entity through a communication system, or via other methods. If the difference falls below the established threshold, the method may end following operation 307. If the difference falls outside the established threshold, the method may proceed to operation 308.

At operation 308, the difference falls outside the established threshold. In this scenario, the twin inference model may be updated. The twin inference model may be updated in order to more accurately predict data based on measurements performed by the data collectors. The twin inference model may be updated using a second set of training data. The second set of training data may be obtained from reconstructed data stored by the data aggregator and/or data based on measurements performed by the data collectors. The data aggregator may request a second set of training data from the data collectors or obtain this second set of training data from another entity through a communication system operably connecting the data collector and the data aggregator.

The method may end following operation 308.

Turning to FIG. 3C, a flow diagram illustrating a method of data collection in accordance with an embodiment is shown.

At operation 309, a copy of a trained twin inference model is obtained. The twin inference model may be implemented with, for example, a machine learning model. The twin inference model may generate inferences that predict future data obtained by data collectors without having access to the data obtained by the data collectors.

In an embodiment, the copy of the twin inference model may be obtained from the data aggregator via a communication system. In a second scenario, the copy of the twin inference model may be obtained from another entity (e.g., a second data aggregator) operably connected to the data collector via a communication system.

At operation 310, an inference is obtained. The inference may be generated using the copy of the trained twin inference model hosted by the data collector. The inference may be a prediction of data based on measurements performed by the data collector. The inference may be generated without accessing the data from the data collector.

In an embodiment, the inference may be generated by a copy of the twin inference model hosted by another entity (e.g., the data aggregator) and transmitted to the data collector via a communication system.

At operation 311, data is obtained. The data may be based on measurements performed by the data collector. The data may represent some characteristic of an ambient environment. The data may be any type or quantity of data including, for example, temperature data, pH data, humidity data, etc. The data may be obtained by the data collector continuously, at established time intervals, and/or via other modalities.

At operation 312, a difference is obtained. The difference may be a reduced-size representation of data (which the inference model attempts to predict) based on: (i) a measurement performed by the data collector and (ii) an inference generated by the data collector using a copy of a twin inference model hosted by the data collector. Refer to FIG. 2A for more details and examples regarding differences.

At operation 313, the difference is transmitted to the data aggregator. Any number of differences may be transmitted by the data collector to the data aggregator. For example, requests for the differences may be received by the data collector and the data collectors may provide the differences to the data aggregator in response to the requests. Such messages and/or data may be passed via a communication system operably connecting the data collector and the data aggregator.

In an embodiment, in order to further reduce data transmission, any transmitted differences may be subject to quantization to reduce the quantity of bits necessary to transmit the difference. For example, the difference may be rounded to whole integers, the nearest tenth, etc. By doing so, fewer bits may be needed to be transmitted to represent the quantized difference.

In an embodiment, the difference may be provided by the data collector to the data aggregator. The data collectors may be programmed to provide differences at established time intervals or other modalities, as noted above. For example, the data collectors may be programmed to provide a difference once every minute. By doing so, the amount of data transmitted via the communication system may be minimized and, therefore, the consumption of network bandwidth and consumption of power by the data collector for transmission purposes may be reduced.

At operation 314, the data, inference, and difference may be discarded. The data collector may discard the data, inference, and difference associated with each measurement following transmission of the difference to the data aggregator. In a second scenario, the data collector may discard the data, inference, and difference associated with each measurement upon receiving a command from the data aggregator. Discarding the data, inference, and difference associated with each measurement may reduce storage consumption by the data collector.

The method may end following operation 314.

Turning to FIGS. 4A-4I, these figures may illustrate a system similar to that of FIG. 1 in accordance with an embodiment. FIGS. 4A-4I may show actions performed by the system over time. The system may include potential of hydrogen (pH) sensor 400 and reaction vessel monitoring system 401. pH sensor 400 may be operably connected to reaction vessel monitoring system 401 via communication system 101. Communication system 101 may include limited communication bandwidth and may serve a large number of different components (not shown). Consequently, it may be desirable to limit communications between pH sensor 400 and reaction vessel monitoring system 401 to efficiently marshal the limited communication bandwidth so that it is less likely that components of the system are impaired for lack of access to communication bandwidth.

Figure 4A:

Turning to FIG. 4A, consider a scenario where pH sensor 400 collects pH training data 402 from a reaction vessel. pH training data 402 may be collected at various time intervals (e.g., $t_1$, $t_2$, etc.) over the course of one hour and may include the following: $t_1$=8.01, $t_2$=8.00, $t_3$=7.99, $t_4$=8.01, $t_5$=8.00 (e.g., on a scale of 0 to 14 with a score of 7 indicating neutrality, scores below 7 indicating acidity, and scores above 7 indicating base conditions). Reaction vessel monitoring system 401 may obtain pH training data 402 for the purpose of training a twin inference model to predict future pH measurements obtained by pH sensor 400.

Figure 4B:
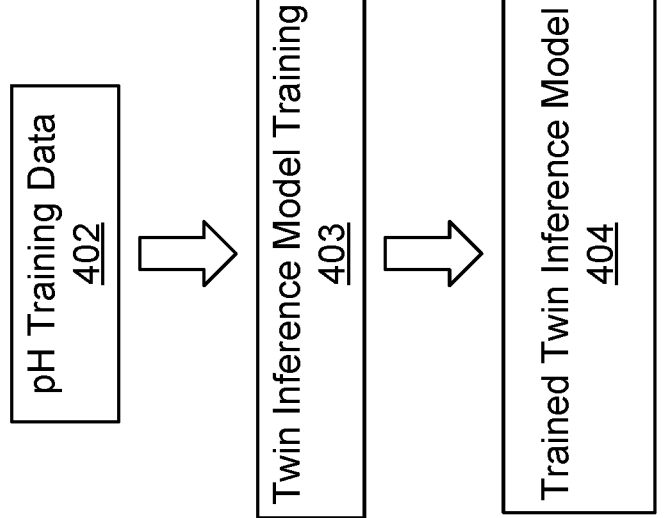

Reaction vessel monitoring system 401 may train a twin inference model based on pH training data 402 to obtain a trained twin inference model. Turning to FIG. 4B, a twin inference model training process is illustrated where pH training data 402 may be used to perform a twin inference model training 403 process to obtain the trained twin inference model 404. For example, reaction vessel monitoring system 401 may perform portions of the methods illustrated in FIGS. 3A and 3B to obtain trained twin inference model 404.

Figure 4C:
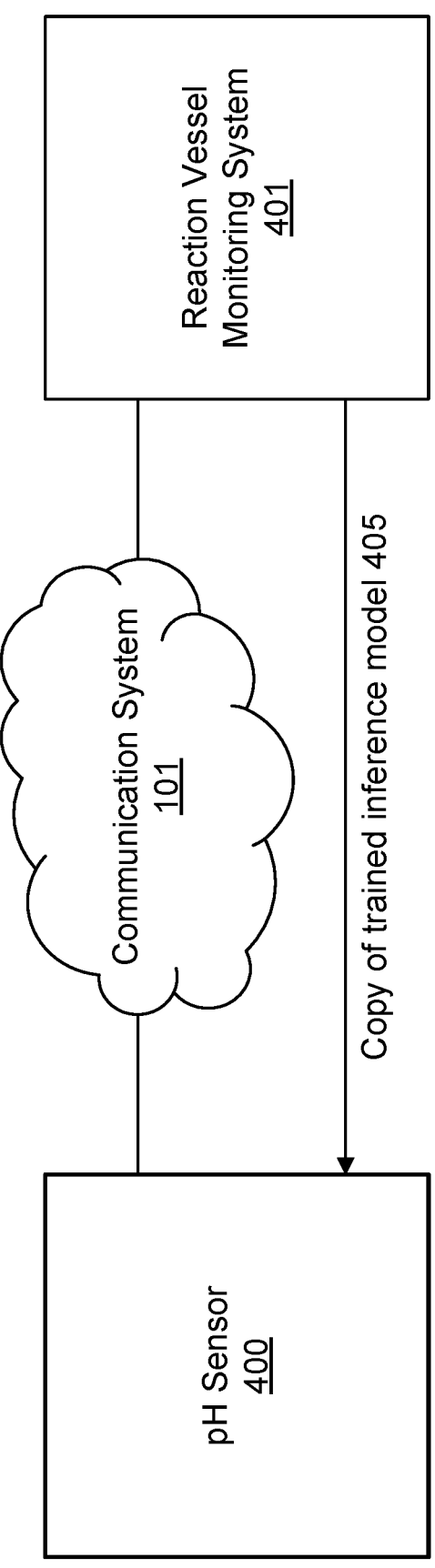

Turning to FIG. 4C, reaction vessel monitoring system 401 may distribute a copy of the trained twin inference model 405 to pH sensor 400. A second copy of the twin inference model may be hosted by the reaction vessel monitoring system. Therefore, pH sensor 400 and reaction vessel monitoring system 401 may have access to identical inferences generated by each copy of the twin inference model as described below.

Figure 4D:
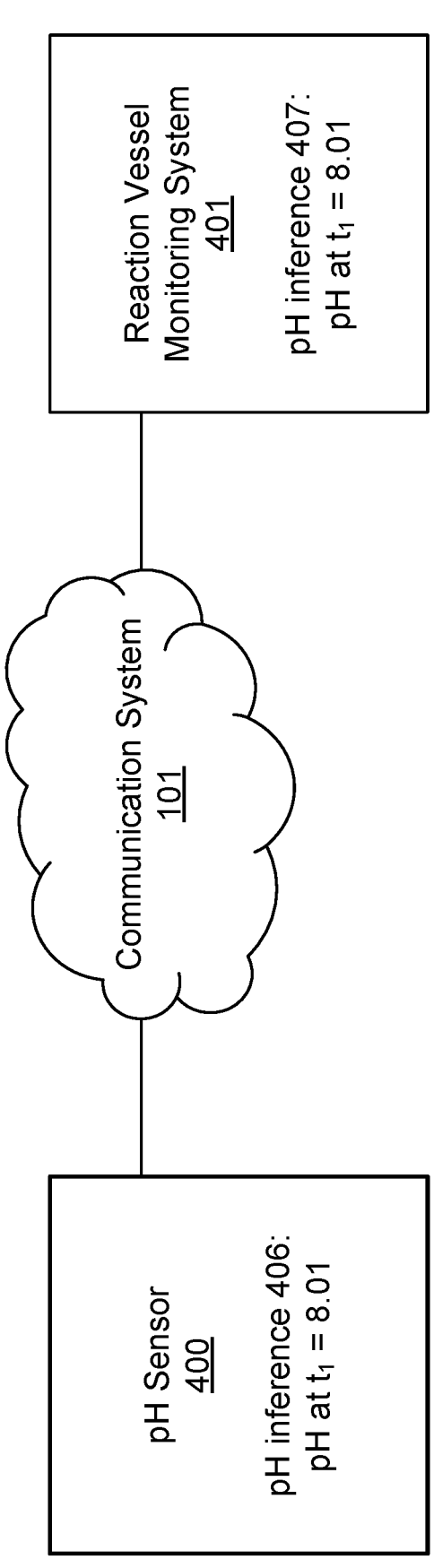

Turning to FIG. 4D, pH sensor 400 and reaction vessel monitoring system 401 may obtain identical pH inferences (e.g., pH inference 406 and pH inference 407) at a given time. The pH inferences may be predictions of pH measurements performed by pH sensor 400. At $t_1$, the copy of the twin inference model hosted by the data collector may generate pH inference 406 of 8.01. At $t_1$, the copy of the twin inference model hosted by the data aggregator may generate pH inference 407 of 8.01 pH sensor 400 and reaction vessel monitoring system 401 may both access this inference without transmitting the inference via communication system 101.

Turning to FIG. 4E, pH sensor 400 may obtain pH measurement 408. The pH measurement 408 may be taken at $t_1$ and the previously described pH inference 406 may be intended to match this pH measurement 408. The pH measurement 408 at $t_1$ may be 8.00. pH sensor 400 may generate pH measurement binary sequence 409 of 10101010 based on the pH measurement 408 of 8.00. pH sensor 400 may also generate pH inference bit sequence 410 of 10101000 based on the pH inference 406 of 8.01. These bit sequences may be utilized to perform a bit-wise difference (e.g., a data-reduction process) in order to minimize the size of the data transmitted to reaction vessel monitoring system 401 as described below.

Figure 4F:
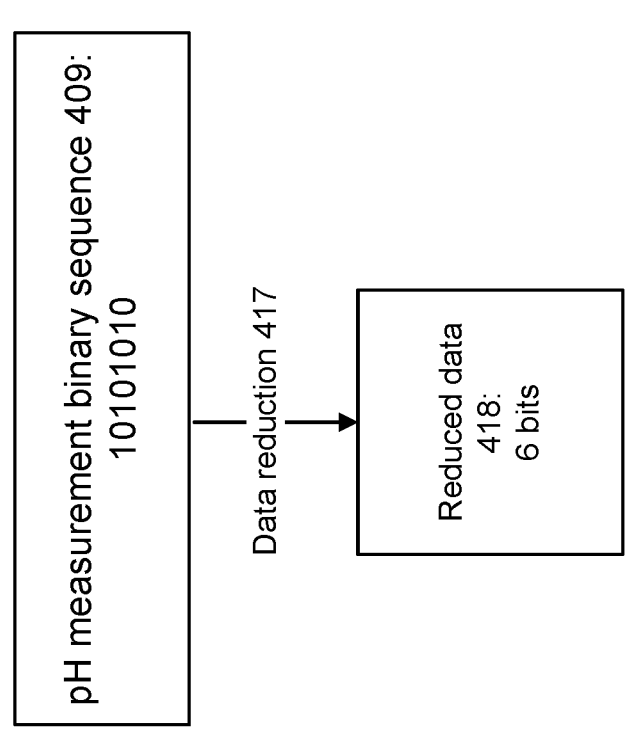

Turning to FIG. 4F, a data reduction process is illustrated. On the left side of the figure, pH sensor 400 may perform a calculate pH difference 412 process to obtain the pH difference binary sequence 413. The pH difference binary sequence 413 may be based on (i) the pH measurement binary sequence 409 of 10101010 and (ii) the pH inference bit sequence 410 of 10101000. In this scenario, the pH difference binary sequence 413 may be 00000010. In the second step, pH sensor 400 may perform a data reduction 414 process to obtain reduced data 415. In this scenario, reduced data 415 contains 2 bits of information. Refer to FIG. 2A for additional details regarding differences and data reduction.

A second data reduction process (e.g., data reduction 417) is illustrated on the right side of the figure. In this scenario, the pH measurement binary sequence 409 of 10101010 may be reduced via data reduction 417 to obtain reduced data 418. Reduced data 418 may contain 6 bits of information. This process may illustrate that reduced data 418 contains more bits of information than reduced data 415. Consequently, performing data reduction on a pH difference rather than the pH measurement may result in a more compressible binary sequence (e.g., pH difference binary sequence 413) and, therefore, a smaller amount of data transmitted by pH sensor 400 to reaction vessel monitoring system 401. Transmitting less data via communication system 101 may result in a reduction in network bandwidth consumption and/or a reduction in power consumption by pH sensor 400 due to data transmission.

Figure 4G:
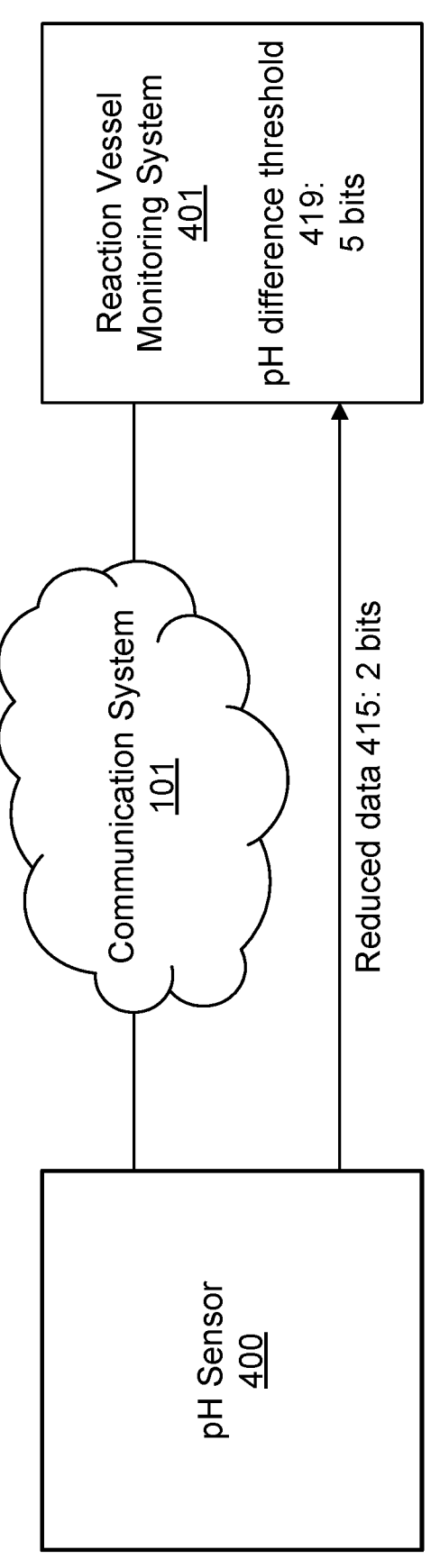

Turning to FIG. 4G, reaction vessel monitoring system 401 may obtain reduced data 415 from pH sensor 400. Reduced data 415 may be expanded by reaction vessel monitoring system 401 and reconstructed as data based on measurements performed by pH sensor 400. By doing so, the bandwidth use of communication system 101 may be reduced by not needing to carry information regarding the pH measurements 408 from pH sensor 400 to reaction vessel monitoring system 401 while reaction vessel monitoring system 401 is still able to operate as though it had access to pH measurements 408. See FIG. 2A for additional details regarding reconstruction of data.

Reaction vessel monitoring system 401 may use an established threshold (e.g., pH difference threshold 419) to determine accuracy of the twin inference model. For example, the pH difference threshold 419 may be 5 bits. Therefore, if the amount of reduced data obtained by reaction vessel monitoring system 401 contains 5 bits or less, the reduced data falls below the threshold and the twin inference model may be treated as accurate. In this scenario, reduced data 415 may contain 2 bits of information and, therefore, the twin inference model may be treated as accurate.

Figure 4H:
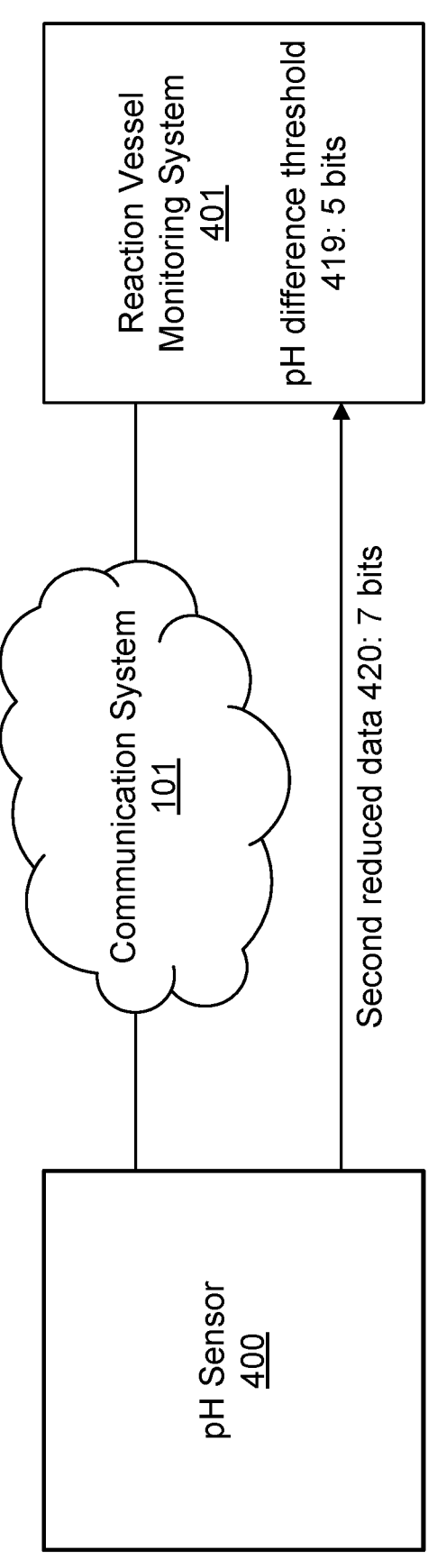

Turning to FIG. 4H, reaction vessel monitoring system 401 may obtain second reduced data 420 from pH sensor 400. Second reduced data 420 may contain 7 bits of information and, therefore, fall outside the pH difference threshold 419 of 5 bits. The twin inference model may be determined inaccurate, and reaction vessel monitoring system 401 may take corrective action in order to improve the accuracy of the twin inference model as described below.

Figure 4I:
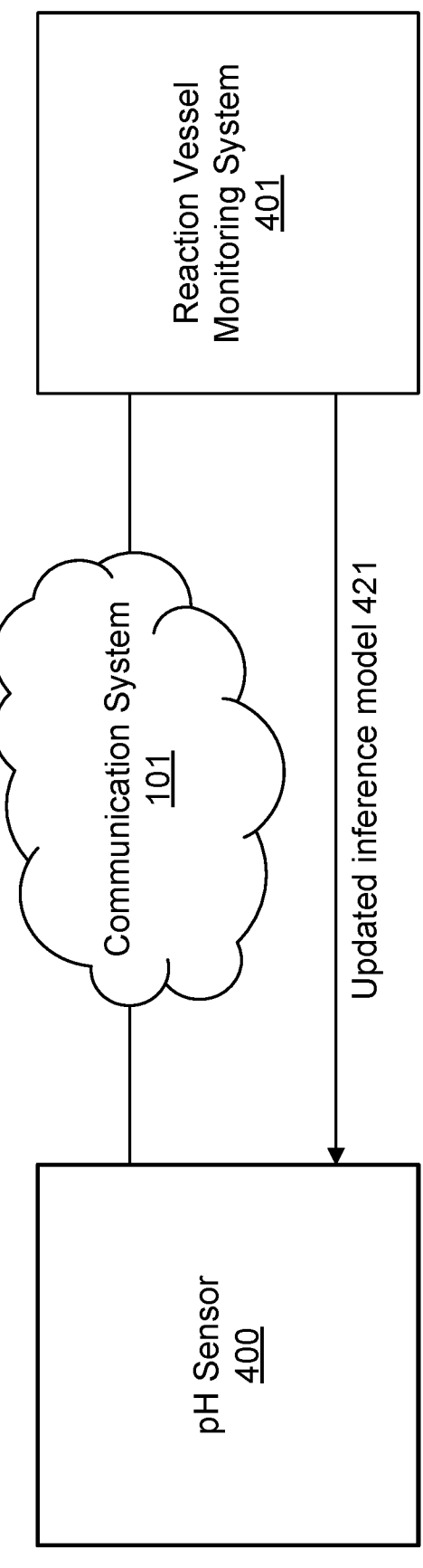

Turning to FIG. 4I, reaction vessel monitoring system 401 may take corrective action to improve the accuracy of the twin inference model by distributing an updated inference model 421 to pH sensor 400. Updated inference model 421 may be obtained by re-training the twin inference model using a second set of training data. The second set of training data may be obtained from pH sensor 400 and/or from the reconstructed data stored by reaction vessel monitoring system 401. By doing so, the accuracy of the inference model may be improved to predict future pH measurements. Consequently, the bandwidth use of communication system 101 may be reduced by minimizing the size of information transmitted from pH sensor 400 to reaction vessel monitoring system 401.

Figure 5:
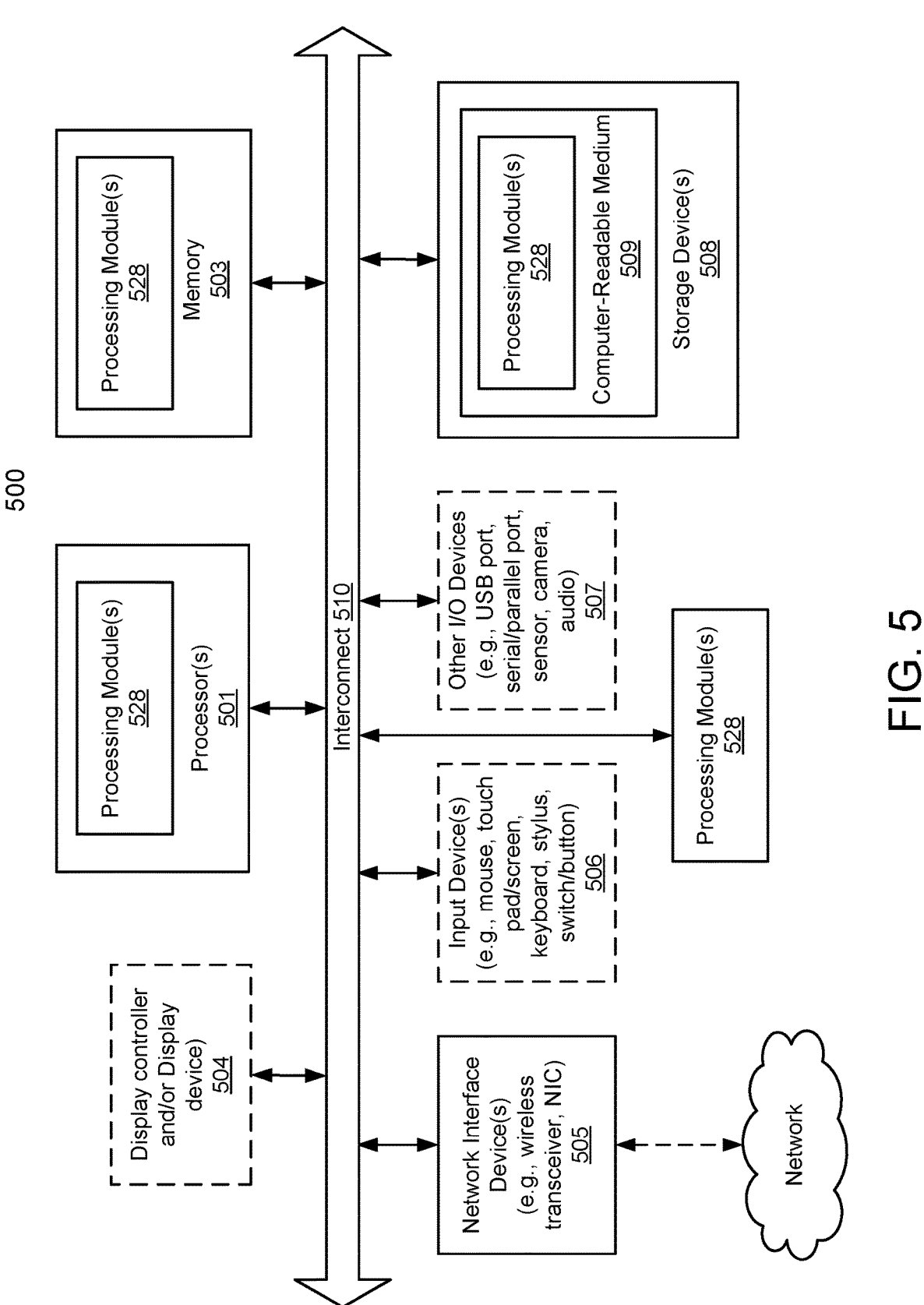
FIG. 5 shows a block diagram illustrating a data processing system in accordance with an embodiment.

Any of the components illustrated in FIGS. 1-4I may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include 10 devices such as devices (e.g., 505, 506, 507, 508) including network interface device(s) 505, optional input device(s) 506, and other optional 10 device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data collection in a distributed environment where data is collected in a data aggregator of the distributed environment and from at least a data collector operably connected to the data aggregator via a communication system, comprising:

obtaining, by the data aggregator, a twin inference model using training data obtained, at least in part, from the data collector;

distributing, by the data aggregator, a copy of the twin inference model to the data collector;

receiving, from the data collector and by the data aggregator, a data transmission including a reduced-size representation obtained by data compression of a binary sequence based on:

data obtained via a measurement performed by the data collector on one or more sensing targets, the data collector being a sensor, and a first inference generated by the data collector using the twin inference model, the first inference being intended to match the data;

reconstructing, by the data aggregator and while the data aggregator does not have access to an actual copy of the data obtained via the measurement performed by the data collector, the data using the reduced-size representation and a second inference generated by the data aggregator, the second inference being intended to match the data and the first inference generated by the data collector; and performing, by the data aggregator and while the data aggregator still does not have access to the actual copy of the data obtained via the measurement performed by the data collector, an action set based at least in part on the reconstructed data, wherein the data collector performs a deletion of the actual copy of the data obtained via the measurement performed by the data collector, the reduced-size representation, and the first inference from internally within the data collector in response to data collector transmitting the reduced-size representation to the data aggregator and without first transmitting the actual copy to the data aggregator before the data collector performs the deletion, in response to receiving the reduced-size representation, transmitting, by the data aggregator and to the data collector, a command based on the reduced-size representation, in case where the reduced-size representation has a bitwise size that is larger than a threshold:

obtaining, by the data collector and in response to the command, a portion of a series of measurements, the command includes a request for at least the portion of the series of measurements; and re-training, by the data aggregator, the twin inference model based on the portion of the series of measurements;

in a case where the bitwise size of the reduced-size representation is less than the threshold:

performing, by the data collector and in response to the command, the deletion of the actual copy of the data, the reduced-size representation, and the first inference; and deleting, by the data aggregator, the reduced-size representation.

2. The method of claim 1, further comprising:

making a determination that the reduced-size representation falls below a threshold; and based on that determination:

treating the twin inference model as being accurate, the twin inference model being implemented by the data aggregator and the data collector, and the twin inference model being used to obtain the first inference and the second inference.

3. The method of claim 1, further comprising:

making a determination that the reduced-size representation falls outside of a threshold; and based on that determination:

treating the twin inference model as being inaccurate, the twin inference model being implemented by the data aggregator and the data collector, and the twin inference model being used to obtain the first inference and the second inference.

4. The method of claim 3, further comprising:

when the twin inference model is determined as being inaccurate:

retraining the twin inference model using training data, the training data comprising a second portion of data obtained via a second series of measurements performed by the data collector.

5. The method of claim 1, wherein a value of the reduced-size representation decreases as accuracy of the twin inference model increases, and the value of the reduced-size representation increases as the accuracy of the twin inference model decreases.

6. The method of claim 5, wherein a quantity of bits necessary to communicate the reduced-size representation via the communication system decreases as the accuracy of the twin inference model increases.

7. The method of claim 6, wherein the action set is not based on any data from measurements performed by the data collector that is transmitted via the communication system to the data aggregator.

8. The method of claim 1, wherein the measurement is performed using a sensor that measures a characteristic of an ambient environment proximate to the data collector, the ambient environment proximate to the data collector being different from an ambient environment proximate to the data aggregator.

9. The method of claim 8, wherein the one or more actions are triggered to be performed based on the ambient environment proximate to the data collector and are independent from the ambient environment proximate to the data aggregator.

10. A non-transitory machine-readable medium having instructions stored therein, which when executed by a processor, cause the processor to perform operations for managing data collection in a distributed environment where data is collected in a data aggregator of the distributed environment and from at least a data collector operably connected to the data aggregator via a communication system, the operations comprising:

obtaining, by the data aggregator, a twin inference model using training data obtained, at least in part, from the data collector;

distributing, by the data aggregator, a copy of the twin inference model to the data collector;

obtaining, from the data collector and by the data aggregator, a data transmission including a reduced-size representation obtained by data compression of a binary sequence based on:

data obtained via a measurement performed by the data collector on one or more sensing targets, the data collector being a sensor, and a first inference generated by the data collector using the twin inference model, the first inference being intended to match the data;

reconstructing, by the data aggregator and while the data aggregator does not have access to an actual copy of the data obtained via the measurement performed by the data collector, the data using the reduced-size representation and a second inference generated by the data aggregator, the second inference being intended to match the data and the first inference generated by the data collector; and performing, by the data aggregator and while the data aggregator still does not have access to the actual copy of the data obtained via the measurement performed by the data collector, an action set based at least in part on the reconstructed data, wherein the data collector performs a deletion of the actual copy of the data obtained via the measurement performed by the data collector, the reduced-size representation, and the first inference from internally within the data collector in response to data collector transmitting the reduced-size representation to the data aggregator and without first transmitting the actual copy to the data aggregator before the data collector performs the deletion, in response to receiving the reduced-size representation, transmitting, by the data aggregator and to the data collector, a command based on the reduced-size representation, in case where the reduced-size representation has a bitwise size that is larger than a threshold:

obtaining, by the data collector and in response to the command, a portion of a series of measurements, the command includes a request for at least the portion of the series of measurements; and re-training, by the data aggregator, the twin inference model based on the portion of the series of measurements;

in a case where the bitwise size of the reduced-size representation is less than the threshold:

performing, by the data collector and in response to the command, the deletion of the actual copy of the data, the reduced-size representation, and the first inference; and deleting, by the data aggregator, the reduced-size representation.

11. The non-transitory machine-readable medium of claim 10, wherein the operations further comprise:

making a determination that the reduced-size representation falls below a threshold; and based on that determination:

treating the twin inference model as being accurate, the twin inference model being implemented by the data aggregator and the data collector, and the twin inference model being used to obtain the first inference and the second inference.

12. The non-transitory machine-readable medium of claim 10, wherein the operations further comprise:

making a determination that the reduced-size representation falls outside of a threshold; and based on that determination:

treating the twin inference model as being inaccurate, the twin inference model being implemented by the data aggregator and the data collector, and the twin inference model being used to obtain the first inference and the second inference.

13. The non-transitory machine-readable medium of claim 12, wherein the operations further comprise:

when the twin inference model is determined as being inaccurate:

updating the twin inference model using training data, the training data comprising a second portion of data obtained via a second series of measurements performed by the data collector.

14. The non-transitory machine-readable medium of claim 10, wherein a value of the reduced-size representation decreases as accuracy of the twin inference model increases, and the value of the reduced-size representation increases as the accuracy of the twin inference model decreases.

15. The non-transitory machine-readable medium of claim 10, wherein the measurement is performed using a sensor that measures a characteristic of an ambient environment proximate to the data collector, the ambient environment proximate to the data collector being different from an ambient environment proximate to the data aggregator.

16. A data system, comprising:

a communication system;

a data collector, operably connected to the communication system, that is a sensor that performs a measurement on one or more sensing targets; and a data aggregator operably connected to the data collector via the communication system, the data aggregator comprising:

a processor; and a memory coupled to the processor to store instructions, which when executed by the processor, cause the processor to perform operations for managing data collection in a distributed environment where data is collected in the data aggregator of the distributed environment and from at least the data collector, the operations comprising:

obtaining, by the data aggregator, a twin inference model using training data obtained, at least in part, from the data collector;

distributing, by the data aggregator, a copy of the twin inference model to the data collector;

obtaining, from the data collector, a data transmission including a reduced-size representation obtained by data compression of a binary sequence based on:

data obtained via the measurement performed by the data collector, and a first inference generated by the data collector using the twin inference model, the first inference being intended to match the data;

reconstructing, and while the data aggregator does not have access to an actual copy of the data obtained via the measurement performed by the data collector, the data using the reduced-size representation and a second inference generated by the data aggregator, the second inference being intended to match the data and the first inference generated by the data collector; and performing, and while the data aggregator still does not have access to the actual copy of the data obtained via the measurement performed by the data collector, an action set based at least in part on the reconstructed data, wherein the data collector performs a deletion of the actual copy of the data obtained via the measurement performed by the data collector, the reduced-size representation, and the first inference from internally within the data collector in response to data collector transmitting the reduced-size representation to the data aggregator and without first transmitting the actual copy to the data aggregator before the data collector performs the deletion, in response to receiving the reduced-size representation, transmitting, by the data aggregator and to the data collector, a command based on the reduced-size representation, in case where the reduced-size representation has a bitwise size that is larger than a threshold:

obtaining, by the data collector and in response to the command, a portion of a series of measurements, the command includes a request for at least the portion of the series of measurements; and re-training, by the data aggregator, the twin inference model based on the portion of the series of measurements;

in a case where the bitwise size of the reduced-size representation is less than the threshold:

performing, by the data collector and in response to the command, the deletion of the actual copy of the data, the reduced-size representation, and the first inference; and deleting, by the data aggregator, the reduced-size representation.

17. The data system of claim 16, wherein the operations further comprise:

making a determination that the reduced-size representation falls below a threshold; and based on that determination:

treating a twin inference model as being accurate, the twin inference model being implemented by the data aggregator and the data collector, and the twin inference model being used to obtain the first inference and the second inference.

18. The data system of claim 16, wherein the operations further comprise:

making a determination that the reduced-size representation falls outside of a threshold; and based on that determination:

treating a twin inference model as being inaccurate, the twin inference model being implemented by the data aggregator and the data collector, and the twin inference model being used to obtain the first inference and the second inference.

19. The data system of claim 18, wherein the operations further comprise:

when the twin inference model is determined as being inaccurate:

updating the twin inference model using training data, the training data comprising a second portion of data obtained via a second series of measurements performed by the data collector.

20. The data system of claim 16, wherein the measurement is performed using a sensor that measures a characteristic of an ambient environment proximate to the data collector, the ambient environment proximate to the data collector being different from an ambient environment proximate to the data aggregator.

* * * * *